US009596375B2

(12) United States Patent
Matsuno

(10) Patent No.: US 9,596,375 B2
(45) Date of Patent: Mar. 14, 2017

(54) IMAGE CAPTURING APPARATUS FOR RECORDING A RAW IMAGE, CONTROL METHOD OF IMAGE CAPTURING APPARATUS, AND NON-TRANSITORY COMPUTER READABLE STORAGE MEDIUM WITH CONTINUOUS SHOOTING MODE CONTROL OF DEVELOPMENT PROCESS ON RAW IMAGE DATA IN ACCORDANCE WITH FREE STORAGE SPACE

(71) Applicant: CANON KABUSHIKI KAISHA, Tokyo (JP)

(72) Inventor: Taro Matsuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 14/698,037

(22) Filed: Apr. 28, 2015

(65) Prior Publication Data
US 2015/0334264 A1 Nov. 19, 2015

(30) Foreign Application Priority Data
May 14, 2014 (JP) .............................. 2014-100783

(51) Int. Cl.
*H04N 1/21* (2006.01)
(52) U.S. Cl.
CPC ....... *H04N 1/215* (2013.01); *H04N 2201/212* (2013.01); *H04N 2201/214* (2013.01)
(58) Field of Classification Search
CPC ............. H04N 1/215; H04N 2201/214; H04N 2201/212

USPC ....................................... 396/424; 348/231.3
See application file for complete search history.

(56) References Cited

U.S. PATENT DOCUMENTS

| 6,710,808 | B1 * | 3/2004 | Yamagishi ........... H04N 5/2353 348/221.1 |
| 8,878,951 | B2 | 11/2014 | Minobe | |
| 2002/0012051 | A1 * | 1/2002 | Mizoguchi ........... H04N 1/2112 348/220.1 |
| 2003/0158838 | A1 * | 8/2003 | Okusa ................ G06F 17/30244 |
| 2003/0227554 | A1 * | 12/2003 | Kazami .............. H04N 1/00129 348/231.3 |

(Continued)

FOREIGN PATENT DOCUMENTS

JP 2011-244423 A 12/2011

*Primary Examiner* — Roberto Velez
*Assistant Examiner* — Cynthia Segura
(74) *Attorney, Agent, or Firm* — Fitzpatrick, Cella, Harper & Scinto

(57) ABSTRACT

An image capturing apparatus comprising an image capturing unit, a generating unit which generates RAW image data with an image obtained by the image capturing unit, wherein the generating unit sequentially generates RAW image data of a plurality of pictures in a continuous shooting mode, a storage unit temporarily storing the RAW image data, a first development unit performing development processing on the RAW image data, a recording unit recording, onto a recording medium, first image data obtained by the first development unit and the RAW image data and a control unit, in the continuous shooting mode, performing control so that the first development unit does not perform the development processing on the RAW image data if free storage space of the storage unit available for storing the RAW image data is smaller than a first threshold.

11 Claims, 12 Drawing Sheets

(56) References Cited

U.S. PATENT DOCUMENTS

| | | | |
|---|---|---|---|
| 2005/0146621 A1* | 7/2005 | Tanaka | H04N 1/00127 348/211.2 |
| 2007/0242947 A1* | 10/2007 | Matsushima | G03B 17/14 396/429 |
| 2009/0087176 A1* | 4/2009 | Ozaki | H04N 1/00427 396/310 |
| 2009/0232480 A1* | 9/2009 | Jendbro | G11B 27/034 386/224 |
| 2010/0134655 A1* | 6/2010 | Kuroiwa | H04N 1/2112 348/231.2 |
| 2011/0242360 A1* | 10/2011 | Mori | H04N 5/772 348/231.1 |
| 2011/0261215 A1 | 10/2011 | Minobe | |
| 2012/0044399 A1* | 2/2012 | Hirai | H04N 5/23245 348/333.01 |
| 2013/0188065 A1* | 7/2013 | Wegener | H04N 21/2381 348/207.99 |
| 2014/0085495 A1* | 3/2014 | Almalki | H04N 5/23251 348/208.6 |
| 2014/0204243 A1* | 7/2014 | Hayashi | H04N 5/23293 348/231.99 |

* cited by examiner

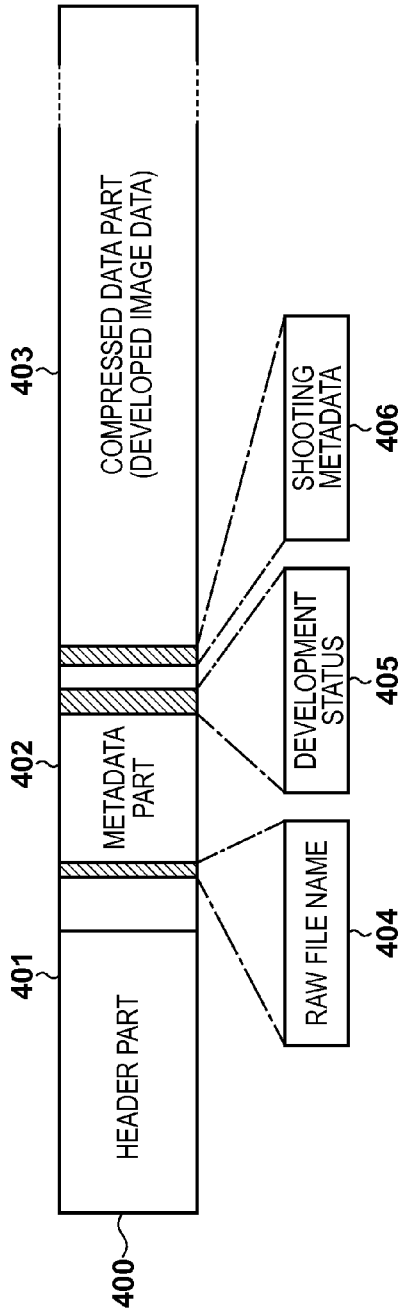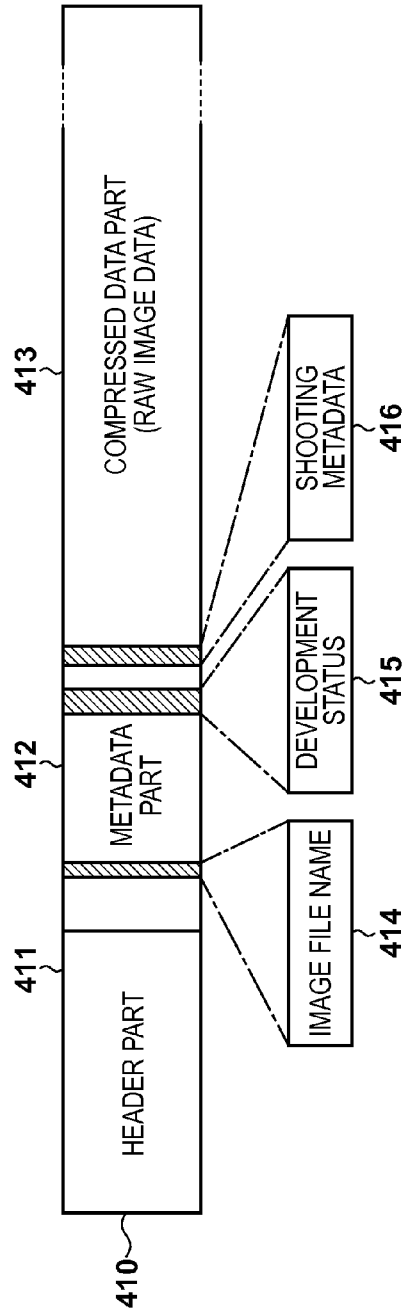

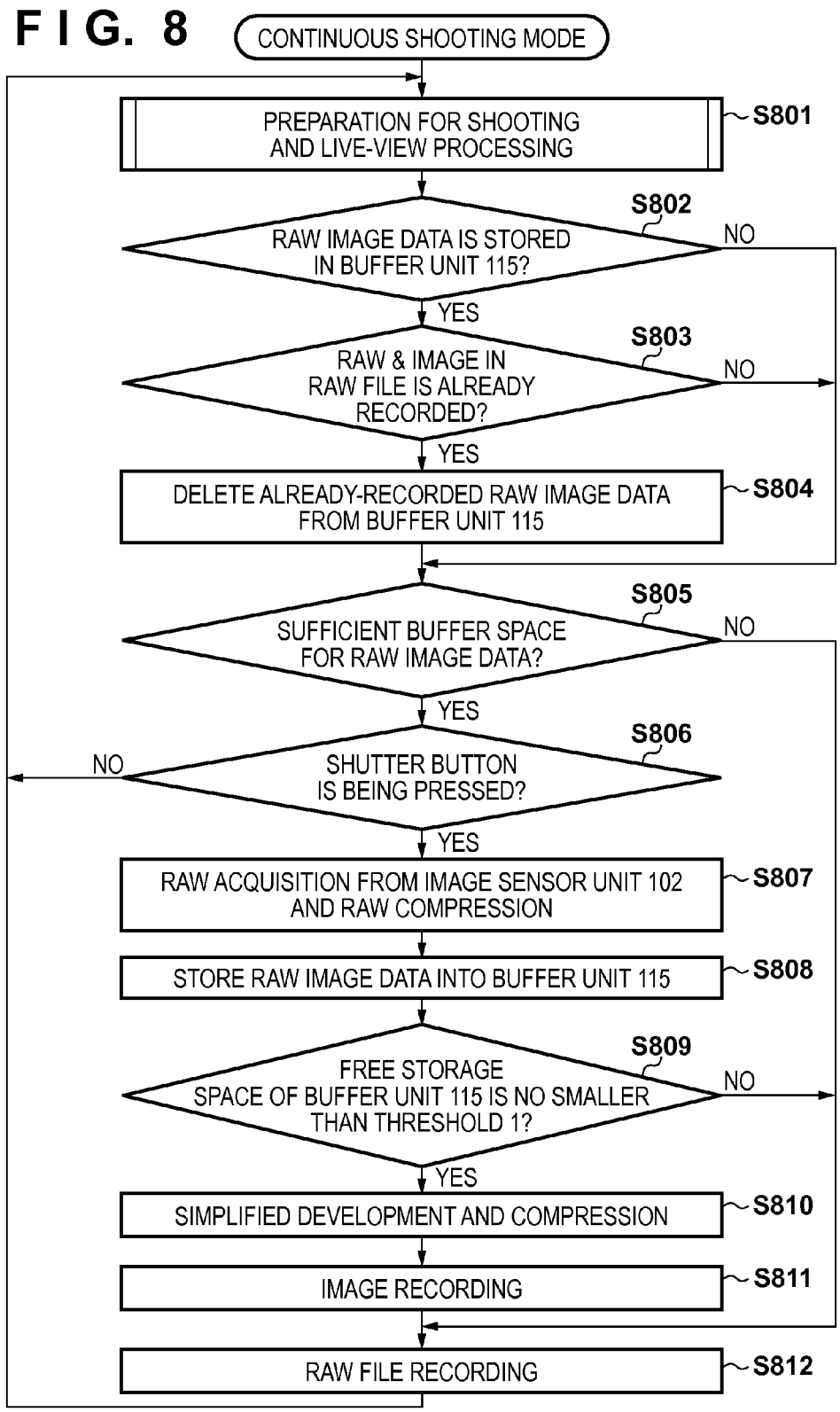

| SD CARD CLASS→<br>SPEED OF CONTINUOUS SHOOTING ↓(IMAGES/SECOND) | Class2 | Class4 | Class6 | Class10 |
|---|---|---|---|---|
| 2 IMAGES/SECOND (LOW SPEED) | 40% | 30% | 20% | 10% |
| 4 IMAGES/SECOND (MIDDLE SPEED) | 50% | 40% | 30% | 20% |
| 6 IMAGES/SECOND (HIGH SPEED) | 60% | 50% | 40% | 30% |

FIG. 12A

| SD CARD CLASS→<br>SPEED OF CONTINUOUS SHOOTING ↓(IMAGES/SECOND) | Class2 | Class4 | Class6 | Class10 |
|---|---|---|---|---|
| 2 IMAGES/SECOND (LOW SPEED) | 50% | 45% | 40% | 35% |
| 4 IMAGES/SECOND (MIDDLE SPEED) | 55% | 50% | 45% | 40% |
| 6 IMAGES/SECOND (HIGH SPEED) | 60% | 55% | 50% | 45% |

FIG. 12B

| SD CARD CLASS→<br>SPEED OF CONTINUOUS SHOOTING ↓(IMAGES/SECOND) | Class2 | Class4 | Class6 | Class10 |
|---|---|---|---|---|
| 2 IMAGES/SECOND (LOW SPEED) | 20% | 15% | 10% | 5% |
| 4 IMAGES/SECOND (MIDDLE SPEED) | 25% | 20% | 15% | 10% |
| 6 IMAGES/SECOND (HIGH SPEED) | 30% | 25% | 20% | 15% |

IMAGE CAPTURING APPARATUS FOR RECORDING A RAW IMAGE, CONTROL METHOD OF IMAGE CAPTURING APPARATUS, AND NON-TRANSITORY COMPUTER READABLE STORAGE MEDIUM WITH CONTINUOUS SHOOTING MODE CONTROL OF DEVELOPMENT PROCESS ON RAW IMAGE DATA IN ACCORDANCE WITH FREE STORAGE SPACE

BACKGROUND OF THE INVENTION

Field of the Invention

The present invention relates to an image capturing apparatus, a control method of an image capturing apparatus, and a non-transitory computer readable storage medium.

Description of the Related Art

Image capturing apparatuses transform raw image information (RAW image) captured by an image sensor into signals including luminance signals and color difference signals. To each signal thus obtained, so-called development processing, which includes denoising, optical distortion correction, image optimization, etc. is applied, and the luminance signals and color difference signals that have undergone the development processing are compression-coded and recorded on a recording medium.

Some image capturing apparatuses, however, are capable of recording RAW images per se. Although RAW images have a vast amount of data to be recorded, they have the advantage of not being altered or degraded from the original image, and being editable after shooting. A configuration of an image capturing apparatus that records RAW images is disclosed in Japanese Patent Laid-Open No. 2011-244423. Japanese Patent Laid-Open No. 2011-244423 discloses a configuration for recording development parameters together with a RAW image, and then developing and playing back the RAW image by using the development parameters.

Assume a case where a continuous shooting is performed by an image capturing apparatus that is capable of storing a RAW image and a developed image (e.g. a JPEG image) generated by performing development processing on the RAW image onto a recording medium such as an SD card. While the apparatus is performing a continuous shooting (i.e., while the shutter button is kept being pressed), RAW image data is stored (i.e. buffered) into a temporary memory such as a DRAM buffer one after another. The RAW image data sequentially undergo development processing and compression processing and are transferred to and recorded on the recording medium, in the order they were buffered.

In this case, if the amount, per unit time, of the data buffered into the temporary memory during the continuous shooting is greater than the amount, per unit time, of the data that has undergone the development processing and compression processing on the temporary memory and then transferred to the recording medium, the storage space of the temporary memory will be fully occupied by the RAW image data. If the storage space of the temporary memory is fully occupied by the RAW image data, the speed of the buffering of the RAW image data generated by the continuous shooting will decrease to the speed of the development processing and the compression processing performed on the RAW image data on the temporary memory and the transferring and the storing of the data onto the recording medium. In other words such a situation results in degradation of the speed of continuous shooting performed by the image capturing apparatus.

SUMMARY OF THE INVENTION

In view of the above, in an image capturing apparatus that is capable of storing a RAW image and a developed image generated by performing development processing on the RAW image, the present invention suppresses degradation of the speed of continuous shooting that possibly occurs when the continuous shooting lasts.

According to some embodiments of the invention, an image capturing apparatus is provided. The apparatus comprises an image capturing unit, a generating unit configured to generate RAW image data by using an image obtained by the image capturing unit, wherein the generating unit sequentially generates RAW image data of a plurality of pictures in a continuous shooting mode, a storage unit configured to temporarily store the RAW image data, a first development unit configured to perform development processing on the RAW image data, a recording unit configured to record, onto a recording medium, first image data obtained by the first development unit and the RAW image data, and a control unit configured to, in the continuous shooting mode, perform control so that the first development unit does not perform the development processing on the RAW image data if free storage space of the storage unit available for storing the RAW image data is smaller than a first threshold.

Further features of the present invention will become apparent from the following description of exemplary embodiments (with reference to the attached drawings).

BRIEF DESCRIPTION OF THE DRAWINGS

FIG. 4A is an example of a configuration of an image file according to an embodiment of the invention.

FIG. 4B is an example of a configuration of a RAW file according to an embodiment of the invention.

FIG. 8 is a flowchart relating to processing performed in a continuous shooting mode according to Embodiment 1 of the invention.

FIGS. 12A and 12B are diagrams showing examples of threshold values for making a determination as to the amount of free storage space according to Embodiment 2 of the invention.

DESCRIPTION OF THE EMBODIMENTS

Embodiment 1

The following provides a detailed description of an embodiment of the present invention, with reference to the drawings.

Figure 1:
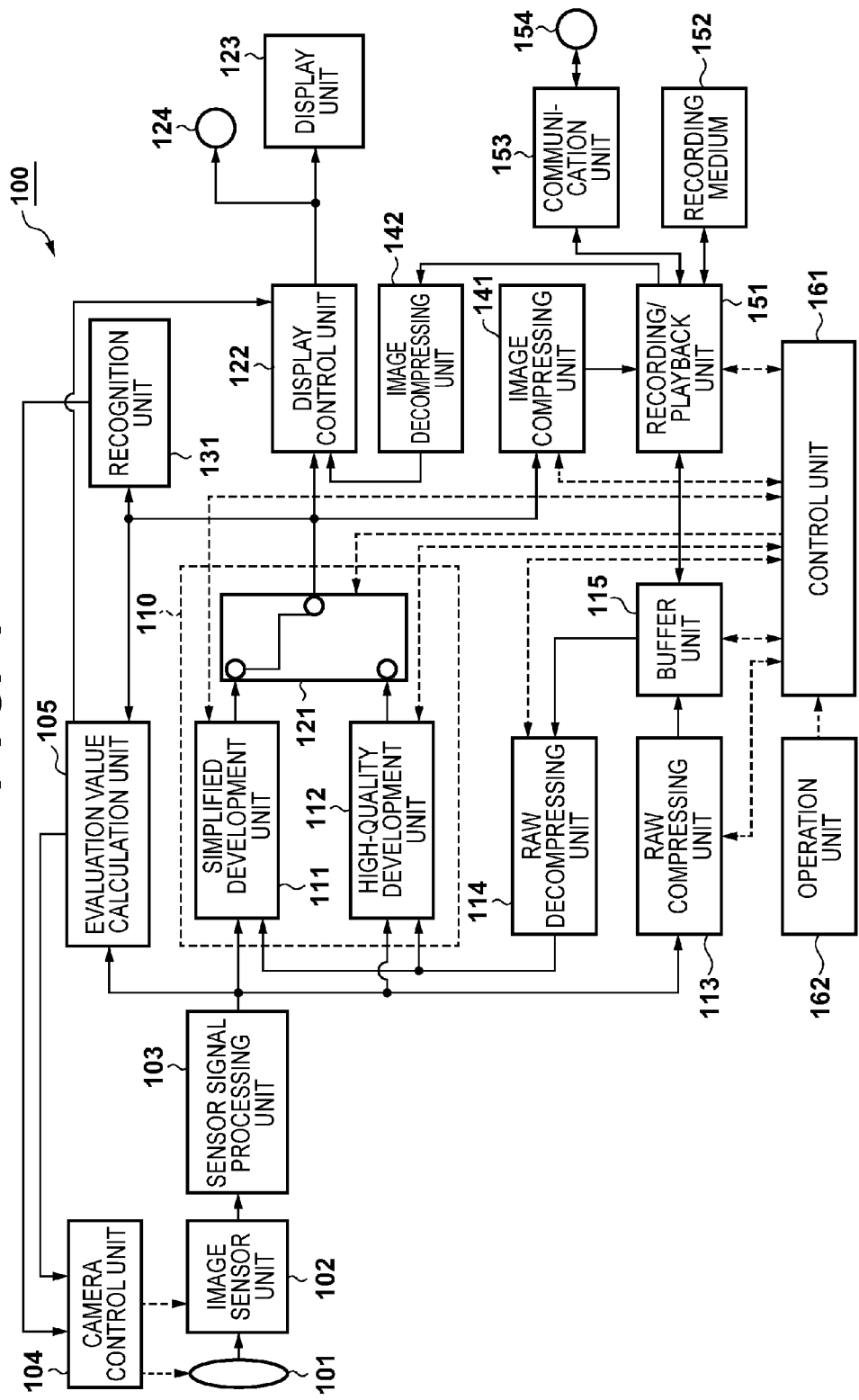
FIG. 1 is a block diagram showing an example of the configuration of an image capturing apparatus according to an embodiment of the present invention.

FIG. 1 is a block diagram showing an example of the configuration of an image capturing apparatus according to an embodiment of the present invention. An image capturing apparatus 100 shown in FIG. 1 has the function of recording image information obtained by shooting a subject onto a recording medium. The image capturing apparatus 100 also has the function of reading image information from a recording medium and displaying an image by performing development processing, as well as the function of exchanging image information with an external apparatus, a server (cloud), etc. Therefore, an image capturing apparatus according to the embodiment of the invention may also be referred to as an image processing apparatus, a recording apparatus, a playback apparatus, a recording/playback apparatus, a communication apparatus, etc.

In the image capturing apparatus 100 shown in FIG. 1, each block other than physical devices such as an image sensor, a display element, an input device, and a terminal may be configured as hardware using dedicated logic circuitry or a memory. Alternatively, each block may be configured as software implemented by a computer such as a CPU executing a processing program stored in a memory. In addition, the image capturing apparatus 100 may be configured as any sort of information processing terminal or image capturing apparatus other than a digital camera, such as a personal computer, a mobile telephone, a smartphone, a PDA, a tablet terminal, or a digital video camera.

In FIG. 1, a control unit 161 includes a CPU and a memory that stores a control program to be executed by the CPU, and controls the entire operation of the image capturing apparatus 100. An operation unit 162 includes an input device used by a user to input an instruction to the image capturing apparatus 100, such as a key, a button, and a touch panel. The operation unit 162 also includes a shutter button that provides the image capturing apparatus 100 with an image capturing instruction to capture the subject. The user can perform a continuous shooting by selecting a continuous shooting mode and keeping holding down the shutter button included in the operation unit 162. An operation signal from the operation unit 162 is detected by the control unit 161, and is controlled by the control unit 161 so that the image capturing apparatus 100 operates according to the operation signal. A display unit 123 includes, for example, a liquid crystal display (LCD) for displaying an image captured or played back by the image capturing apparatus 100, a menu screen, various sorts of information, etc.

When an instruction to start a shooting operation, based on operation of the shutter button included in the operation unit 162, is detected by the control unit 161, an optical image of the shooting subject is input via an imaging optical unit 101, and forms an image on an image sensor unit 102. The operation of the imaging optical unit 101 and the image sensor unit 102 during a shooting is controlled by the camera control unit 104. For this control, the camera control unit 104 receives the results of evaluation value calculation with respect to the aperture, focus, blurring associated with camera shake, etc., obtained by an evaluation value calculation unit 105, and subject information extracted by a recognition unit 131.

Figures 9, 10:
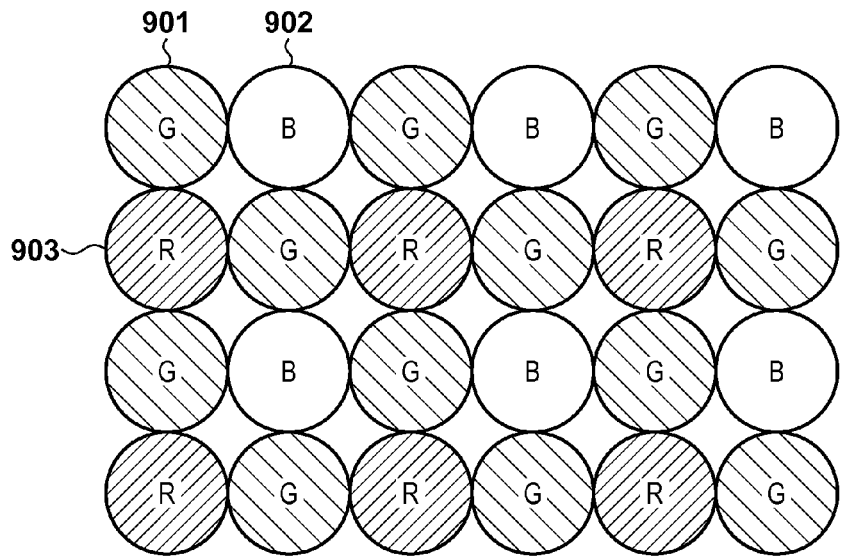
FIG. 9 is a diagram illustrating a pixel arrangement according to an embodiment of the invention.
FIG. 10 is a diagram showing an example of threshold values for determining the amount of free storage space according to Embodiment 1 of the invention.

The image sensor unit 102 includes an image sensor such as a CCD or CMOS sensor, and transforms the light passing through red, green, and blue (RGB) color filters provided for each pixel, into electrical signals. FIG. 9 is an example of a color filter provided in the image sensor unit 102, and shows a pixel arrangement in an image treated by the image capturing apparatus 100. As shown in FIG. 9, red (R) 903, green (G) 901, and blue (B) 902 colors, one color for one pixel, are arranged in a mosaic pattern. Every four (2×2) pixels constitute a group, which is composed of one red pixel, one blue pixel, and two green pixels, and such groups are arranged in a regular manner. Such an arrangement is commonly called Bayer arrangement.

The electrical signals resulting from the transformation performed by the image sensor unit 102 undergo pixel value restoration performed by sensor signal processing unit 103. The pixel value restoration includes processing for interpolating the values of missing pixels or unreliable pixels of the image sensor unit 102 by using the values of neighboring pixels, and processing for subtracting a predetermined offset value from the values of missing pixels or unreliable pixels. In the present embodiment, the image information output by the sensor signal processing unit 103 is referred to as an RAW image, which means a raw (undeveloped) image.

RAW images undergo development processing performed by the development unit 110. The development unit 110 has a plurality of different development units, and is configured to include a simplified development unit 111 as a first development unit, a high-quality development unit 112 as a second development unit, and a switch 121 that selects either one of the outputs therefrom. Both the simplified development unit 111 and the high-quality development unit 112 perform debayering (demosaicing) on a RAW image to transform it to signals including luminance signals and color difference signals, and apply, to each signal, so-called development processing, which includes denoising, optical distortion correction, image optimization, etc.

In particular, the high-quality development unit 112 performs each sort of processing with a higher accuracy than the simplified development unit 111. Due to the high accuracy, the image quality of the developed image is higher than when the simplified development unit 111 is used. On the other hand, the processing load is greater. The high-quality development unit 112 of the present embodiment therefore does not dedicate itself to real-time development processing in parallel with shooting, and is configured to perform distributed processing, taking certain time after the shooting. By performing the high-quality development processing by taking certain time after the shooting instead of performing it during the shooting, it is possible to reduce the circuit size and the increase (peak) of the power consumption.

On the other hand, the simplified development unit 111 can only achieve a lower image quality than the high-quality development unit 112, but is configured to reduce the amount of the processing related to the development, compared to the high-quality development processing, so that the development processing can be performed at a high speed during the shooting. Since the processing load of the simplified development unit 111 is low, the simplified development unit 111 is used when real-time developing is performed in parallel with the operation for shooting. The switch 121 is switched by the control unit 161 according to an operational instruction input by the user from the operation unit 162 and to control corresponding to the operation mode that is being executed.

In the present embodiment, the simplified development unit 111 and the high-quality development unit 112 independently exist in the development unit 110. However, a configuration in which a single development unit performs either simplified development processing or high-quality development processing while switching between operation modes is also included in the scope of the present invention.

The image information that has undergone the development processing performed by the development unit 110 further undergoes predetermined display processing performed by a display control unit 122, and is then displayed by the display unit 123. The image information that has undergone the development processing may be output to an externally-connected display device by a video output terminal 124. The video output terminal 124 includes a general-purpose interface such as HDMI or SDI.

The image information that has undergone the development processing performed by the development unit 110 is also supplied to the evaluation value calculation unit 105. The evaluation value calculation unit 105 calculates evaluation values with respect to the focus state, the exposure state, etc. from the image information.

The image information that has undergone the development processing performed by the development unit 110 is also supplied to the recognition unit 131. The recognition unit 131 has the function of detecting and recognizing the subject information included in the image information. For example, the recognition unit 131 detects a human face within an image represented by the image information, and if a human face is detected, outputs positional information of the human face, and furthermore, recognizes a particular human based on feature information of the face or the like.

The image information that has undergone the development processing performed by the development unit 110 is supplied to an image compressing unit 141. The image compressing unit 141 performs high-efficiency encoding (compression encoding) on the subject image information, in order to generate image information with a reduced amount of information, and transforms the image information into an image file. For example, JPEG may be used for image compression. In the case of compressing the image information as a video, MPEG-2, H.264, H.265, etc. may be used.

A RAW compressing unit 113 performs high-efficiency encoding using technology such as wavelet transformation or delta encoding on the RAW image data output by the sensor signal processing unit 103 so as to transform the data into RAW image data in a compressed state, and stores the data into a buffer unit (temporary memory) 115 for temporarily holding data. The RAW compressing unit 113 is also capable of storing the RAW image data output by the sensor signal processing unit 103 into buffer unit 115 without performing RAW compression. Although the RAW image data can be left in the buffer unit 115 and be read again by the RAW decompressing unit 114, the RAW image data stored in the buffer unit 115 may be transferred to and stored on another recording medium 152 (i.e. may be deleted from the buffer unit 115).

A RAW decompressing unit 114 reads the RAW image data stored in the buffer unit 115, and decodes and decompresses the compressed RAW image data. The RAW image data decompressed by the RAW decompressing unit 114 is supplied to the simplified development unit 111 and the high-quality development unit 112 included in the development unit 110.

The RAW file including the RAW image data and the image file including the developed image data are each recorded onto the recording medium 152 by the recording/playback unit 151. The recording medium 152 is, for example, a built-in large capacity memory or hard disk, a detachable memory card, etc. The recording/playback unit 151 is also capable of reading the image file and the RAW file from the recording medium 152. The recording/playback unit 151 is capable of writing or reading various files into/from an external storage or server via a communication unit 153. The communication unit 153 is configured to be capable of accessing the Internet or an external device by using a communication terminal 154 via wireless communication or wired communication.

When playback operation is started, the recording/playback unit 151 acquires and plays back a desired file from the recording medium 152 or via the communication unit 153. When the playback-target file is a RAW file, the recording/playback unit 151 stores the RAW image data stored in the acquired RAW file into the buffer unit 115. After that, the RAW decompressing unit 114 reads the RAW image data stored in the buffer unit 115, and decodes and decompresses the compressed RAW image data. The RAW image data decompressed by the RAW decompressing unit 114 is supplied to the high-quality development unit 112 in the development unit 110. The high-quality development unit 112 performs high-quality development processing on the supplied RAW image data to generate a playback image, and supplies a playback image to the display control unit 122. On the other hand, when the playback target file is an image file, the recording/playback unit 151 supplies the image data stored in the acquired image file to an image decompressing unit 142. The image decompressing unit 142 decodes and decompresses the input image data to generate a playback image of the image, and supplies the playback image to the display control unit 122.

Figure 2:
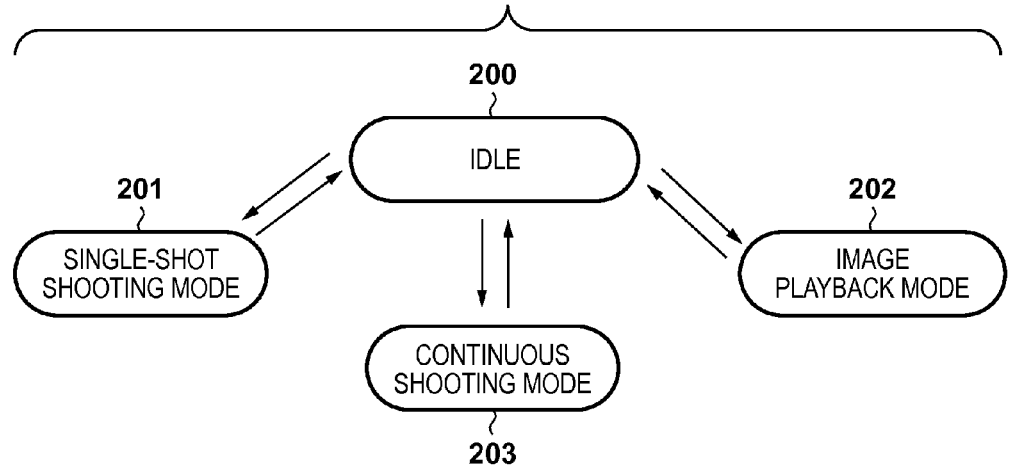
FIG. 2 is a state transition diagram according to an embodiment of the invention.

Next, a description is given to operation modes of the image capturing apparatus 100 according to the present embodiment, with reference to drawings. FIG. 2 is a state transition diagram showing transition between operation modes of the image capturing apparatus 100. Such operation state transition occurs according to the user's operational instruction from the operation unit 162 or a determination made by the control unit 161, and may be caused manually according to the operation, or occur automatically. As shown in FIG. 2, the image capturing apparatus 100 operates while switching to an appropriate mode among three modes via the idle state (200). The three modes are, namely, the single shooting mode (201), the image playback mode (202), and the continuous shooting mode (203). In the present embodiment, the single shooting mode (201), the idle state (200), and the image playback mode (202) are described first, and then the continuous shooting mode (203) which characterizes the present invention is described.

Figure 3:
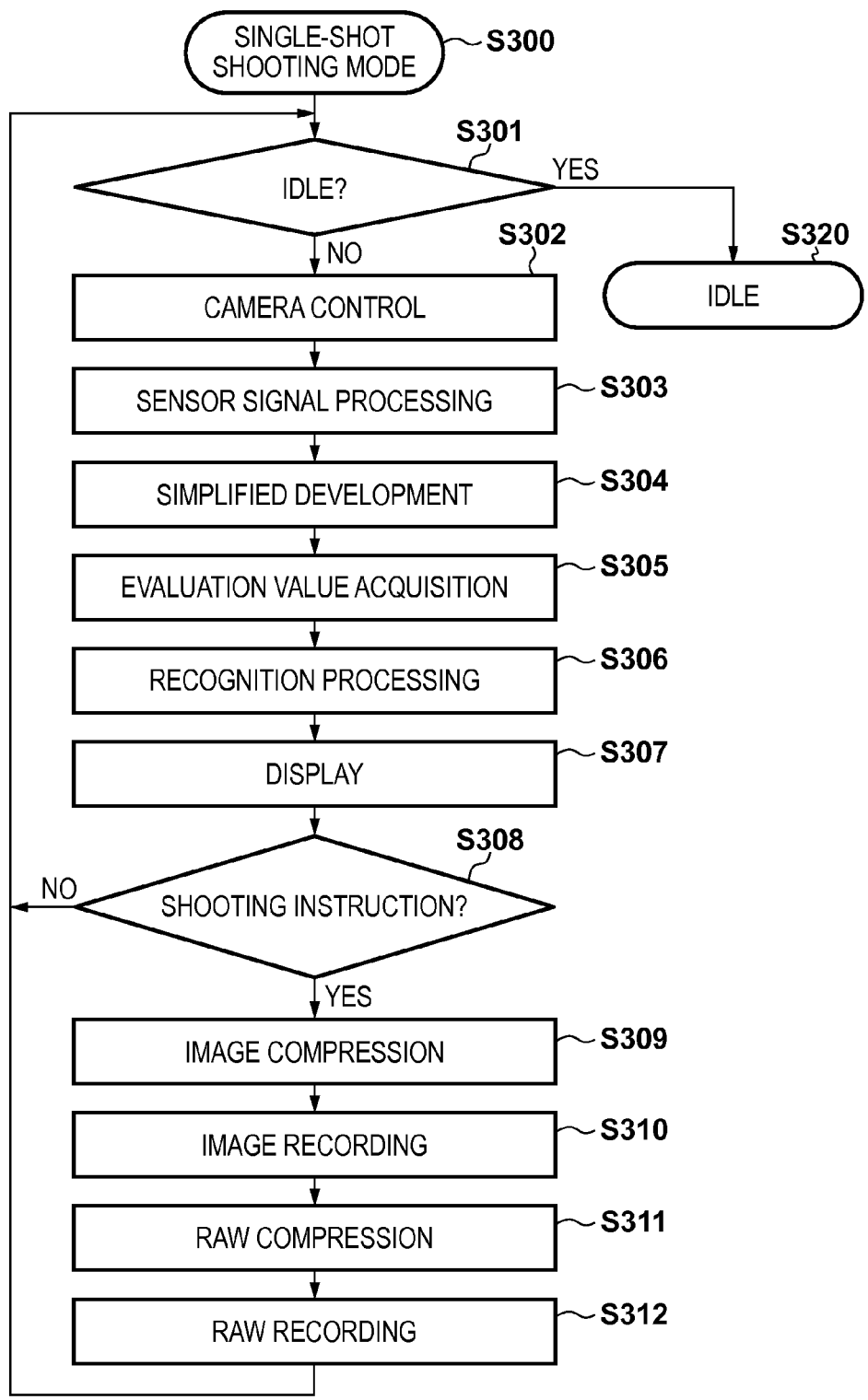
FIG. 3 is a flowchart relating to processing performed in a single shooting mode according to an embodiment of the invention.

First, a description is given to operation of the image capturing apparatus 100 in the single shooting mode 201. FIG. 3 shows a flowchart relating to processing performed in the single shooting mode according to the present embodiment. The flowchart shown in FIG. 3 illustrates the processing procedure performed by the control unit 161 while controlling each processing block. A program stored in a memory (ROM) of the control unit 161 is written into a memory (RAM), and a CPU executes the program, thereby executing the procedure.

In FIG. 3, when operation in the single shooting mode 201 is started, the control unit 161, at S301, determines whether the processing load on the image capturing apparatus 100 is low or not. When the processing load is low, transition to the idle state occurs as indicated by S320, and otherwise the processing advances to S302. The occurrence frequency of the transition depends on the processing load. For example, during a continuous high-speed shooting, the processing always advances to S302 instead of advancing to S320, because the processing load is high. In the case of a usual one-shot image capturing, the processing advances to S320 during the first shooting and the second shooting, for example at a half the occurrence frequency.

At S302, the camera control unit 104 controls the operation of the imaging optical unit 101 and the image sensor unit 102 so as to perform shooting. For example, a lens included in the imaging optical unit 101 is moved according to a user instruction for zooming and focusing, and the reading area of the image sensor unit 102 is determined according to an instruction indicating the number of pixels used for the shooting. Also, a focus adjustment and a focus tracking with respect to a particular subject is controlled based on evaluation value information and subject information provided from the evaluation value calculation unit 105 and the recognition unit 131 as described below.

At S303, the sensor signal processing unit 103 performs signal processing on the electrical signals resulting from the transformation performed by the image sensor unit 102, in order to restore the pixel values. The processing performed here includes processing for interpolating the values of missing pixels or unreliable pixels by using the values of neighboring pixels, and processing for subtracting a predetermined offset value from the values of missing pixels or unreliable pixels. In the present embodiment, the image information output from the sensor signal processing unit 103 after the processing performed at S303 is referred to as RAW image data, which means a raw (undeveloped) image.

At S304, the simplified development unit 111 develops the RAW image data. At this moment, the control unit 161 causes the switch 121 included in the development unit 110 to output the image information that has undergone the development processing performed by the simplified development unit 111. The simplified development unit 111 performs debayering (demosaicing) on the RAW image data, thereby transforming the RAW image data into signals including luminance signals and color difference signals, and applies, to each signal, so-called development processing, which includes denoising, optical distortion correction, image optimization, etc. Here, a description is given to the development processing (simplified development) performed by the simplified development unit 111. The simplified development unit 111 achieves high-speed or simplified development processing by limiting the image size after the development processing to two million pixels or less, limiting the denoising or the optical distortion correction to particular processing, or omitting the denoising or the optical distortion correction. Since the simplified development unit 111 performs the processing after reducing the image size or partially limits the functions of the development processing, the image capturing apparatus 100 can perform high-performance shooting, such as shooting with two million pixels at the rate of 60 frames per second, with a small circuit size and a low power consumption.

The image information that has undergone the development processing performed by the simplified development unit 111 is supplied to the evaluation value calculation unit 105. At S305, the evaluation value calculation unit 105 calculates evaluation values with respect to the focus state, the exposure state, etc. from luminance values and contrast values included in the image information. Note that the evaluation value calculation unit 105 may acquire the RAW image data before the development processing and calculate evaluation values from the RAW image in the same manner. The image information that has undergone the development processing performed by the simplified development unit 111 is supplied to the recognition unit 131. At S306, the recognition unit 131 detects the subject (e.g., a human face) from the image information, and recognizes the subject information. For example, the recognition unit 131 determines the presence or the absence of a human face in the image information, detects the position thereof, performs recognition of a particular human, and outputs information indicating the result.

The image information that has undergone the development processing performed by the simplified development unit 111 is also supplied to the display control unit 122. At S307, the display control unit 122 forms a display image from the acquired image information, and outputs the image to the display unit 123 or an external display apparatus to display the image. The display image formed by the display unit 123 is used for live-view display (shooting through-image display) in the single shooting mode 201, by which the user can frame the subject. Note that the display image may be output from the display control unit 122 to another display apparatus such as an external television via the video output terminal 124. Furthermore, the display control unit 122 is also capable of, for example, displaying a mark on the focus area of the display image or displaying a frame around the recognized human face, by using the evaluation value information or the subject information provided from the evaluation value calculation unit 105 and the recognition unit 131.

At S308, the control unit 161 detects a shooting instruction input from the user, and the processing advances to S309 when the shooting instruction is detected. At S308, when there is no shooting instruction, the processing returns to S301, and the preparation operation for shooting and the live-view display are repeatedly performed.

In response to the shooting instruction at S308, the image information that has undergone the development processing performed by the simplified development unit 111 is supplied to the image compressing unit 141. At S309, the image compressing unit 141 performs high-efficiency encoding (image compression) on the acquired image information, thereby generating an image file (a first image file) as a simplified image. Note that the image compressing unit 141 performs the image compression processing by using a known technology such as JPEG.

At S310, the recording/playback unit 151 records the image file onto the recording medium 152. Furthermore, in response to the shooting instruction at S308, the RAW compressing unit 113, at S311 acquires the RAW image data that corresponds to the captured image and is output from the sensor signal processing unit 103, and performs high-efficiency encoding (RAW compression) on the RAW image data. The RAW image data compressed by the RAW compression is stored into the buffer unit 115. The high-efficiency encoding performed by the RAW compressing unit 113 uses a known technology such as wavelet transformation or delta encoding, and may be lossy compression or lossless compression. Alternatively, the RAW compression by the RAW compressing unit 113 may be omitted, and the RAW image data in the uncompressed state may be output as it is. Regardless of whether or not the RAW compression is performed, the RAW image data generated in the present embodiment is data that retains the most of the image information provided from the sensor signal processing unit 103 and that can be reconstructed as a high-quality image.

After the recording/playback unit 151 records the RAW file including the RAW image data onto the recording medium 152 at S312, the processing advances to S301. Note that, at S310 and S312, the recording/playback unit 151 may transfer the image file and/or the RAW file to an external storage from the communication terminal 154 via the communication unit 153 so that the files are recorded on the external storage. In the flowchart shown in FIG. 3, the RAW compression/recording is performed after the image compression/recording, as shown in S309 to S312. However, this order may be reversed. Also, these processes may be performed in parallel. This concludes the description of the flowchart relating to the processing performed in the single shooting mode 201 according to the present embodiment.

Here, a description is given to the configuration of the image file and the configurations of the RAW file according to the present embodiment. FIG. 4A and FIG. 4B are, respectively, a diagram showing an example of the configuration of an image file and a diagram showing an example of the configuration of a RAW file. An image file 400 shown in FIG. 4A is recorded by the recording/playback unit 151 in, for example, a predetermined recording area of the recording medium 152. The image file 400 includes a header part 401, a metadata part 402, and a compressed data part 403. The header part 401 includes, for example, an identification code indicating that this file is in the format of an image file. The compressed data part 403 includes compressed image data that has undergone the high-efficiency encoding.

The metadata part 402 includes file name information 404 indicating the file name of the RAW file including the RAW image data corresponding to the image data stored in this image file. The metadata part 402 also includes development status information 405, which includes a flag indicating whether this image file includes image data generated by the simplified development processing performed by the simplified development unit 111 or image data generated by the high-quality development processing performed by the high-quality development unit 112. The metadata part 402 also includes shooting metadata 406, which includes the evaluation values and the subject information obtained by the evaluation value calculation unit 105 and the recognition unit 131, and information about the condition of the shooting (e.g., lens type identification information and sensor type identification information) obtained from the imaging optical unit 101 and the image sensor unit 102. In addition, although not shown in the drawing, the metadata part 402 may also include an identification code identifying the recording medium on which the corresponding RAW file is recorded, and path information specifying the location of the folder in which the RAW file is recorded.

The RAW file 410 shown in FIG. 4B is either stored in the buffer unit 115 or recorded by the recording/playback unit 151 on, for example, a predetermined recording area of the recording medium 152. Note that when the RAW image data is stored in the buffer unit 115, it is not necessary that the data is stored in the form of files in the order shown in FIG. 4B. Also note that information of the RAW image data, the header part, and the metadata part may be retained in the buffer unit 115 even after being recorded onto the recording medium 152. The RAW file 410 includes a header part 411, a metadata part 412, and a compressed data part 413. The header part 411 includes, for example, an identification code indicating that this file is in the format of a RAW file. The compressed data part 413 includes compressed RAW image data that has undergone the high-efficiency encoding (the RAW image data may be in an uncompressed form).

The metadata part 412 includes file name information 414 indicating the file name of the image file including the image data generated by performing the development processing on the RAW image data included in this RAW file. The metadata part 412 also includes development status information 415, which includes a flag indicating whether the image data included in the image file has been generated by the simplified development processing performed by the simplified development unit 111 or by the high-quality development processing performed by the high-quality development unit 112. The metadata part 412 also includes shooting metadata 416, which includes the evaluation values and the subject information obtained by the evaluation value calculation unit 105 and the recognition unit 131, and information about the condition of the shooting (e.g., lens type identification information and sensor type identification information) obtained from the imaging optical unit 101 and the image sensor unit 102. In addition, although not shown in the drawing, the metadata part 412 may also include an identification code identifying the recording medium on which the RAW file is recorded, and path information specifying the location of the folder in which the RAW file is recorded. In addition, the metadata part 412 may also include an identification code identifying the recording medium on which the corresponding image file is recorded, and path information specifying the location of the folder in which the image file is recorded. Alternatively, the image file per se may be transformed into metadata and stored in the metadata part 412. The configurations of the above-described files according to the present embodiment are merely examples, and they may have a configuration conforming to a standard such as DCF or EXIF.

As described above, in the single shooting mode 201, the image capturing apparatus 100 according to the present embodiment uses the simplified development unit 111 when performing the live-view display before a shooting instruction or the development processing on an image file generated in response to a shooting instruction. The simplified development unit 111 limits the image size after the development processing to two million pixels or less, or limits the denoising or the optical distortion correction to particular processing or omits the denoising or the optical distortion correction. Consequently, high-performance development processing in the case of, for example, shooting with two million pixels at the rate of 60 frames per second can be achieved with a small circuit size and a low power consumption. Meanwhile, the image capturing apparatus 100 according to the present embodiment generates RAW image data in response to an image shooting instruction, as described above. RAW image data is high-quality image data that retains the most of the image information provided from the sensor signal processing unit 103, and development processing is not required when generating this RAW image data. Therefore, the image capturing apparatus 100, with small-scale circuitry and a low power consumption, is capable of recording RAW image data while increasing the number of pixels in images and the speed of the continuous shooting.

Figure 5:
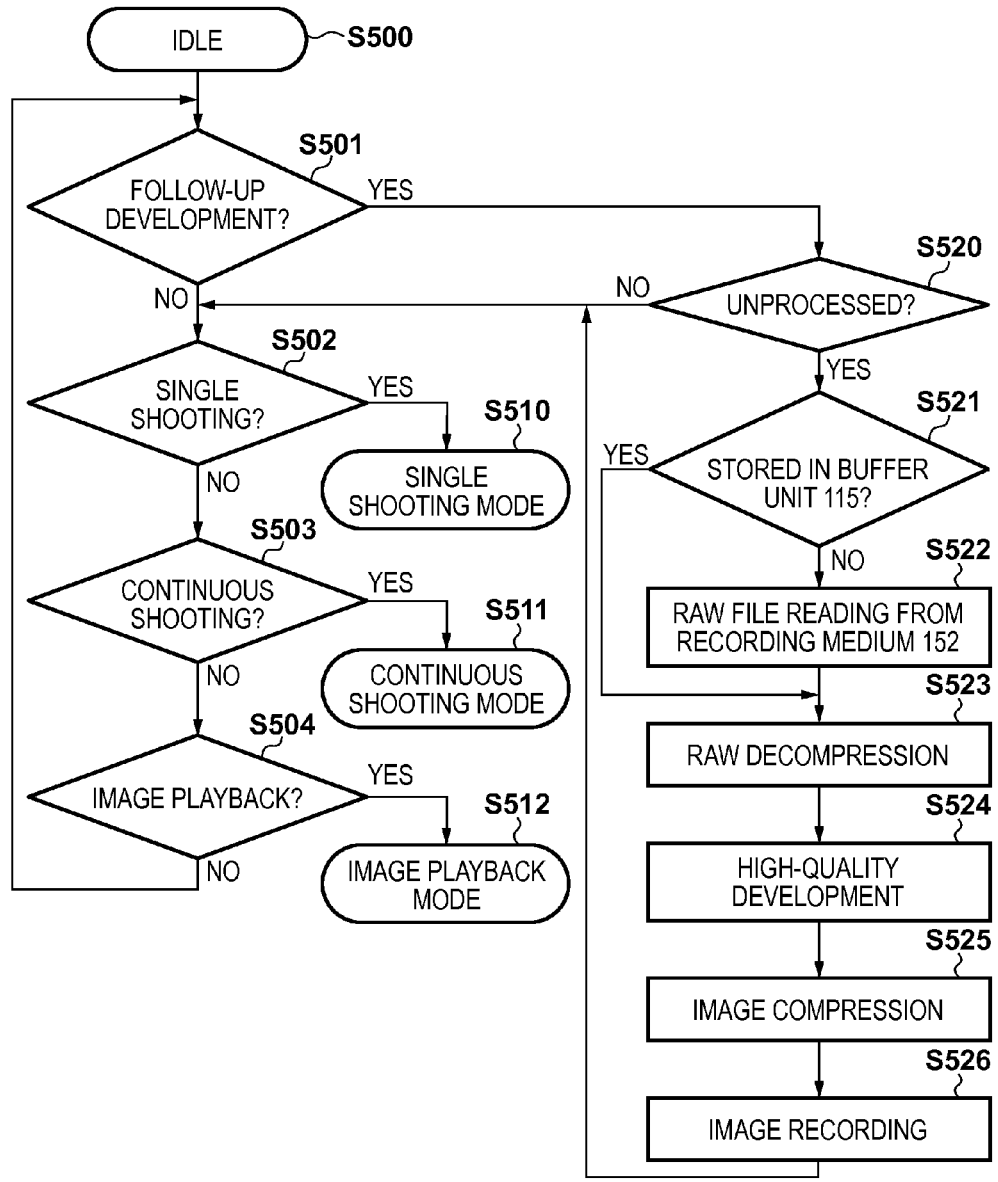
FIG. 5 is a flowchart relating to processing performed in an idle state according to an embodiment of the invention.

Next, with reference to the flowchart shown in FIG. 5, a description is given to idle state processing performed at S320 in FIG. 3. FIG. 5 shows a flowchart relating to processing performed in the idle state according to the present embodiment. The flowchart shown in FIG. 5 illustrates the processing procedure performed by the control unit 161 while controlling each processing block. A program stored in a memory (ROM) of the control unit 161 is written into a memory (RAM), and a CPU executes the program, thereby achieving the procedure.

In FIG. 5, when the idle state processing is started, the control unit 161 determines at S501 whether to perform follow-up development processing in response to a manual operation by the user. The processing advances to S502 when it is determined not to perform the follow-up development processing, and advances to S520 when it is determined to perform the follow-up development processing. When it is determined at S501 that the follow-up development processing is not to be performed, the control unit 161 determines, according to the mode setting input by the user, the mode to be switched to, from among the modes 201, 202, and 203 shown in FIG. 2 (S502, S503, and S504). Then, the control unit 161 performs control so that transition to the processing corresponding to the selected mode (S510, S511, or S512) occurs.

Note that "follow-up development processing" according to the present embodiment is development processing with respect to the RAW image data held in the buffer unit 115 or the RAW image data stored in the RAW file recorded on the recording medium 152, etc., which is performed again with high quality after the completion of the shooting operation, so that a high quality display image or high-quality image data is generated.

As described above, it is the simplified development unit 111 that performs the development processing on image data at the time of shooting. Therefore, the number of pixels in the image is two million pixels or less, a portion of the development processing is omitted, and thus the image quality is limited. Although such an image is useful for making a brief check of the result of shooting, it can be not suitable for checking the details of the image or for printing out. In contrast, RAW image data is high quality data that retains the most of the image information provided from the sensor signal processing unit 103. However, since RAW image data is data that has not undergone the development processing, it is difficult to display or print out the data as it is. Development processing is necessary for displaying or printing out the RAW image data, and the development processing requires certain time. Furthermore, since the format of RAW image data often varies depending on the manufacturer, the environment where RAW image data can be played back is also limited.

The follow-up development processing according to the present embodiment is an effective function in such a situation. In the present embodiment, upon the start of the follow-up development processing, already-recorded RAW image data is read and undergoes the high-quality development processing performed by the high-quality development unit 112. The image data resulting from the high-quality development processing is recorded on the recording medium 152, etc. Such follow-up development processing is performed during a period in which the processing load on the apparatus is relatively low, for example during a period between shootings or when the apparatus is in the playback mode or in the sleep state and is waiting for a user operation. The follow-up development processing is not necessarily manually performed. It may be possible that the follow-up development processing is designed to be automatically performed by the control unit 161.

With such a configuration, it is possible to avoid the necessity of performing development processing later every time the high quality playback is required, e.g., at the time of checking of the details, and the time of printing out. Also, the configuration allows for practical use of RAW image data in the same common environment as conventional image files.

Returning to the description of FIG. 5, for each shooting instruction, an image file, in which image data obtained by development processing is stored, and a RAW file, in which RAW image data is stored, are recorded as a pair on the recording medium 152, etc. In the case where the follow-up development processing is performed manually or automatically, the control unit 161 determines, at S520, for each image set, whether the follow-up development processing has been performed or not. The determination is made by, for example, referring to the flag included in the development status 405 of the image file 400 and indicating whether the image data stored in the image file is data that has undergone the processing performed by the simplified development unit 111 or not. Alternatively, the determination may be made by referring to the development status 415 in the RAW file 410 and determines whether the flag information indicating that the data has undergone the development processing performed by the high-quality development unit 112 is included therein or not. Alternatively, the determination may be performed by using a table file prepared for a series of captured images and indicating the state of the development processing.

When it is determined by the control unit 161 that the follow-up development processing has been performed, transition to S502 occurs. When there is any image that has not undergone the follow-up development processing, transition to S521 occurs. At S521, the control unit 161 determines whether the RAW file corresponding to an image that has not undergone the follow-up development processing is stored in the buffer unit 115 or not. If the RAW file is stored therein, the processing advances to S523, and if not stored, the corresponding RAW file is read from the recording medium 152, etc. at S522.

Data stored in the buffer unit 115 is updated such that a newer image captured in the single shooting mode 201 or the continuous shooting mode 203 is preferentially held therein. In other words, the images are removed from the buffer unit 115 in the order from the oldest to the newest. With this configuration, the image that is most recently captured is always held in the buffer unit 115, and high-speed processing, in which S522 is skipped, can be realized. Furthermore, if the follow-up development processing is performed in reverse chronological order from the image that is most recently captured, the images stored in the buffer unit 115 are preferentially processed, which improves the efficiency of the processing.

At S523, the RAW decompressing unit 114 decompresses the RAW image data read from the buffer unit 115 or the recording medium 152. The RAW image data thus decompressed undergoes the high-quality development processing performed by the high-quality development unit 112 at S524, and is output to the display control unit 122 and the image compressing unit 141 via the switch 121.

The high-quality development unit 112 performs debayering (demosaicing) on the RAW image data, thereby transforming the RAW image into signals including luminance signals and color difference signals, and applies, to each signal, so-called development processing, which includes denoising, optical distortion correction, image optimization, etc. The size (the number of pixels) of the developed image generated by the high-quality development unit 112 is the same as the total size of the image read from the image sensor unit 102 or the size determined by the user, and has a significantly higher quality than the image that has undergone the simplified development processing which limits the image size to two million pixels or less.

The high-quality development unit 112, which performs each sort of processing with a higher accuracy than the simplified development unit 111, can obtain a higher quality developed image, but increases the processing load. The high-quality development unit 112 according to the present embodiment is configured to avoid real-time development processing performed in parallel with shooting and take a certain time to perform the development processing, thereby reducing the circuit size and the power consumption.

The image information that has undergone the development processing performed by the high-quality development unit 112 is supplied to the image compressing unit 141, and, at S525, the image compressing unit 141 performs the high-efficiency encoding processing (image compression) on the acquired image information, thereby generating a high-quality image file (second image file). Note that the image compressing unit 141 performs the compression processing by using a known technology such as JPEG.

At S526, the recording/playback unit 151 records, onto the recording medium 152, etc., the image file storing the image data that has undergone the high-quality development processing, and then transition to S502 occurs. Note that when there are any images that have not undergone the follow-up development processing, the follow-up development processing can be repeatedly performed for each image.

The image file recorded at S526 has the configuration of the image file 400 shown in FIG. 4A, and includes the header part 401, the metadata part 402, and the compressed data part 403. The header part 401 includes, for example, an identification code indicating that this file is in the format of an image file. The compressed data part 403 includes compressed image data that has undergone the high-efficiency encoding.

The metadata part 402 includes file name information 404 indicating the file name of the RAW file storing the RAW image data corresponding to the image data stored in this image file. The metadata part 402 also includes development status information 405, which includes a flag indicating whether the image data included in the image file has been generated by the simplified development processing performed by the simplified development unit 111 or by the high-quality development processing performed by the high-quality development unit 112. The metadata part 402 also includes shooting metadata 406, which has been extracted from the metadata of the corresponding RAW file and which includes the evaluation values and the subject information obtained by the evaluation value calculation unit 105 and the recognition unit 131, and information about the condition of the shooting obtained from the imaging optical unit 101 and the image sensor unit 102.

The image file including the new image data that is obtained by the high-quality development processing and is recorded at S526 is given by the recording/playback unit 151 the same file name as the file name of the image file including the image data obtained by the simplified development processing performed on the RAW image data of the corresponding RAW file, and performs overwriting. In other words, the image file including the image data obtained by the simplified development processing is deleted. Then, the recording/playback unit 151 updates the development status 415 included in the metadata part 412 of the corresponding RAW file by rewriting it with information indicating that the high-quality development process has been performed (or the follow-up development processing has been performed).

As described above, the image capturing apparatus 100 according to the present embodiment performs the follow-up development processing during a period in which the processing load on the apparatus is relatively low, for example during a period between shootings or when the apparatus is in the playback mode or in the sleep state and is waiting for an operation from the user. Thus, the image capturing apparatus 100 sequentially replaces the image files each including image data obtained by the simplified development processing performed during shooting, with the image files each including image data obtained by the high-quality development processing. With such a configuration, it is possible to avoid the necessity of performing development processing every time the high quality playback is required, e.g., at the time of checking of the details, and the time of printing out. Also, the configuration allows for practical use of RAW image data in the same common environment as conventional image files.

Figure 6:
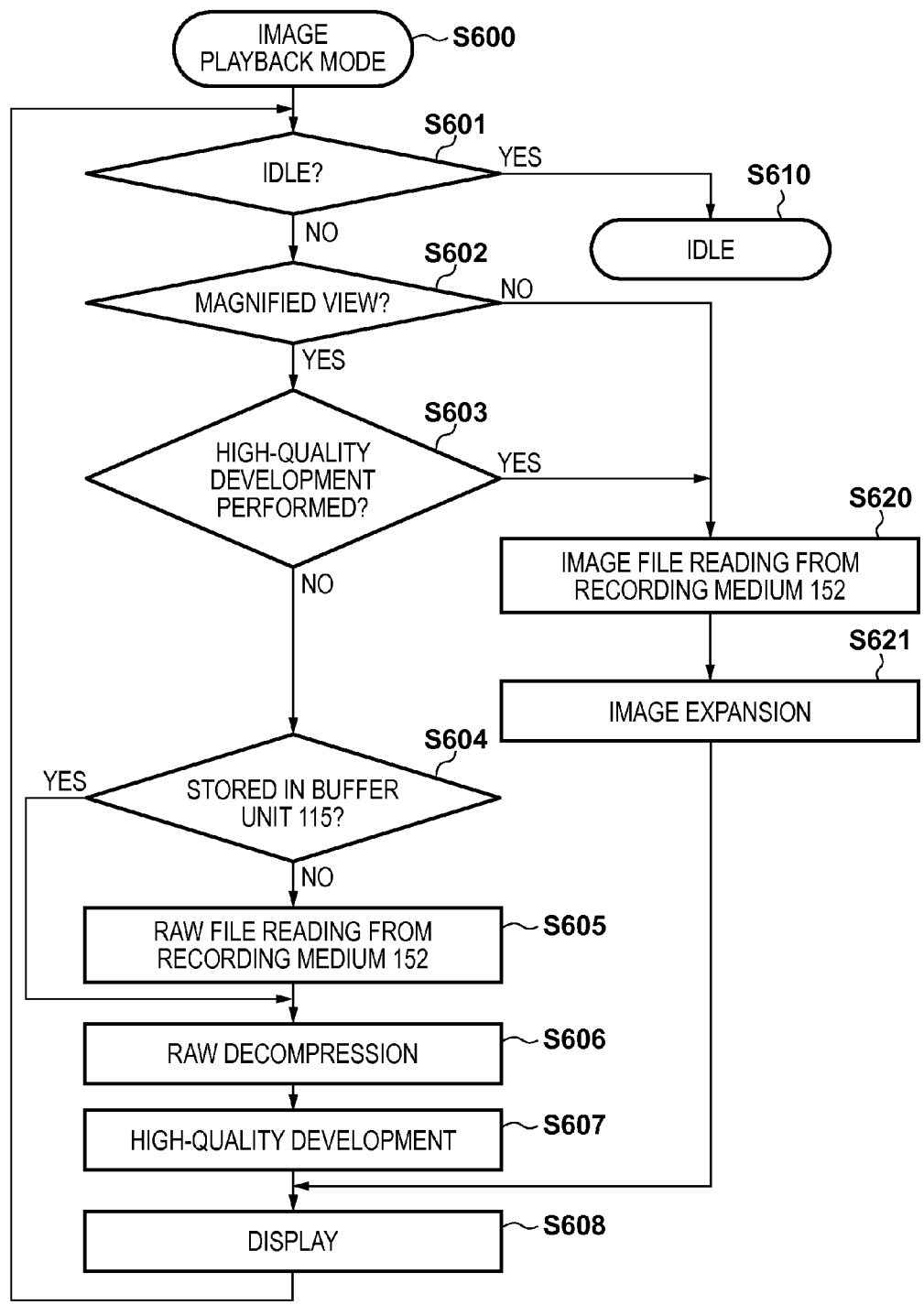
FIG. 6 is a flowchart relating to processing performed in an image playback mode according to an embodiment of the invention.

Next, a description is given to operation of the image capturing apparatus 100 in the image playback mode 202. FIG. 6 shows a flowchart relating to processing performed in the image playback mode 202 according to the present embodiment. The flowchart shown in FIG. 6 illustrates the processing procedure performed by the control unit 161 while controlling each processing block. A program stored in a memory (ROM) of the control unit 161 is written into a memory (RAM), and a CPU executes the program, thereby achieving the procedure.

In FIG. 6, when operation in the image playback mode 202 is started, the control unit 161, at S601, determines whether the processing load on the image capturing apparatus 100 is low or not. When the processing load is low, transition to the idle state occurs as indicated by S610, and otherwise the processing advances to S602. The occurrence frequency of the transition depends on the processing load. For example, during a period of waiting for a user operation such as a playback instruction, the processing advances to S610 because the processing load is low. When playback of an image has been started according to a user operation (including the situation where playback is in progress), the processing advances to S602.

At S602, the control unit 161 determines whether a user instruction to display a magnified view of the image to be played back has been received or not. The flow advances to S603 when the instruction to display a magnified view has been received, and otherwise advances to S620.

Figure 7A:
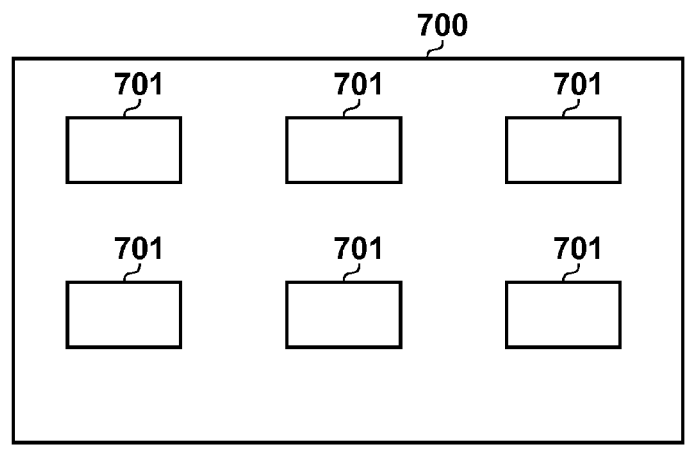
FIGS. 7A to 7C are diagrams showing examples of displaying processing in the image playback mode according to an embodiment of the invention.
Figure 7B:
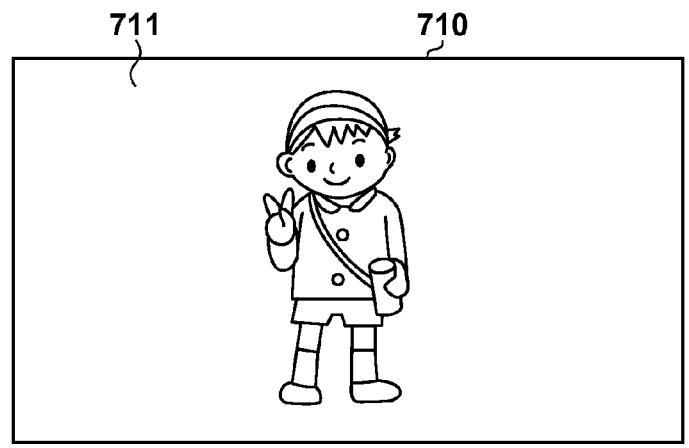
Figure 7C:
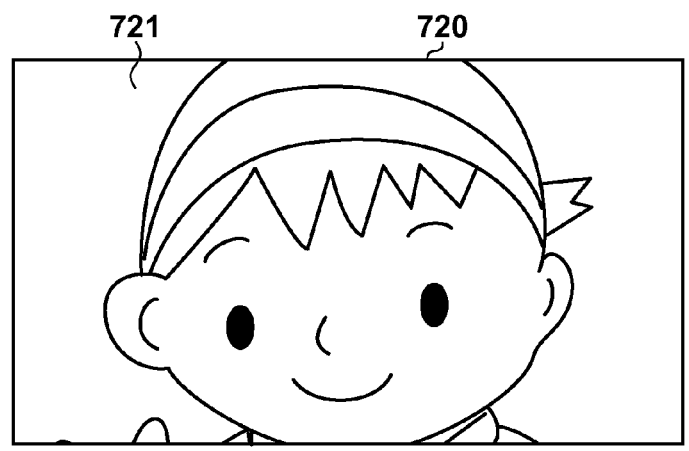

Types of view including a magnified view are described below with reference to FIGS. 7A to 7C. FIGS. 7A to 7C are diagrams showing examples of displaying processing in the image playback mode 202 according to the present embodiment. The example view 700 shown in FIG. 7A is a view (a list view) in which six scaled-down images indicated by the reference number 701 are displayed on the display unit 123. The example view 710 shown in FIG. 7B is a view in which a given single image 711 is entirely displayed on the display unit 123. This view state is referred to as normal view. The example view 720 shown in FIG. 7C is a view in which a magnified view 721 of a portion of a given image is displayed on the display unit 123. For example, in the case of checking the focus state immediately after a shooting, a magnified view as represented by the example view 720 is commonly used to show the details of the subject image.

In the case of displaying a magnified view as represented by the example view 720, the processing illustrated in FIG. 6 advances from S602 to S603. In the case of displaying a scaled-down view as represented by the example view 700, the processing advances from S602 to S620. In the case represented by the example view 710, the processing advances from S602 to S620 when the number of the pixels of the display unit 123 is no greater than the number of the pixels of the image data generated by the simplified development processing (in the case of the above-described example, no greater than two million pixels), because the view to be displayed under such a condition is a same size view or a scaled-down view.

At S620, the recording/playback unit 151 reads the playback-target image file from the recording medium 152, etc. Then, at S621, the image decompressing unit 143 decodes and decompresses the image data included in the image file, and, at S608, the display control unit 122 outputs, to the display unit 123, the display image in the form of any of the views shown in FIGS. 7A to 7C.

When the number of pixels of the display image is no greater than the number of pixels of the image data obtained by the simplified development processing (in the case of the above-described example, no greater than two million pixels), an image having a satisfactory image quality can be displayed even if the image data is the data that has undergone the development processing performed by the simplified development unit 111. Needless to say, the display image naturally has a satisfactory image quality if the image data is the data that has undergone the development processing performed by the high-quality development unit 112.

On the other hand, in the case of displaying a magnified view, there is the possibility that the number of the pixels of the display image is greater than the number of the pixels of the image data obtained by the simplified developing processing (in the case of the above-described example, no greater than two million pixels). In other words, if the image is displayed by using the image data obtained by the simplified developing processing, the resolution perceived by the user will be degraded.

For this reason, in the case of displaying a magnified view, the control unit 161 determines, at S603, whether or not the image data of the image to be displayed as a playback target is data that has undergone the development processing performed by the high-quality development unit 112. This determination is for example performed with reference to the flag included in the development status 405 stored in the metadata part 402 of the image file 400, for example. The flag indicates whether the image file includes image data processed by the simplified development unit 111 or image data processed by the high-quality development unit 112. Alternatively, the determination may be performed with reference to the development status 415 included in the RAW file 410. Alternatively, the determination may be performed by using a table file prepared for a series of captured images and indicating the state of the development processing.

When it is determined at S603 that the image data has undergone the high-quality development processing, the data is regarded as high-quality image data that can maintain a satisfactory image quality even when it is magnified. Therefore, the processing advances to S620. At S620, the recording/playback unit 151 reads the image file including the corresponding high-quality image data from the recording medium 152, etc., and plays back and displays the image data. As described above, when the image data is data that has undergone the high-quality development processing performed by the high-quality development unit 112, a high-quality image can be displayed by the processing starting from S620.

When it is determined at S603 that the image data is not data that has undergone the high-quality development processing, this means that the image data is data that has undergone the development processing performed by the simplified development unit 111. Accordingly, the processing advances to S604 and the high-quality development processing (the follow-up development processing described above) is performed. At S604, the control unit 161 determines whether the RAW file corresponding to the image to be played back is stored in the buffer unit 115 or not. When the RAW file is stored therein, the processing advances to S606. When the RAW file is not stored therein, the recording/playback unit 151 reads the corresponding RAW file from the recording medium 152, etc. at S605, and stores the RAW file into the buffer unit 115. Note that data stored in the buffer unit 115 is updated such that a newer image captured in the single shooting mode 201 or the continuous shooting mode 203 is preferentially held therein. In other words, the images are removed from the buffer unit 115 in the order from the oldest to the newest. With this configuration, the image that is most recently captured is always held in the buffer unit 115, and high-speed processing, in which S605 is skipped, can be realized.

At S606, the RAW decompressing unit 114 decodes and decompresses the RAW image data read from the buffer unit 115 or the recording medium 152, etc. The decompressed RAW image data undergoes high-quality development processing performed by the high-quality development unit 112 at S607, and is output to the display control unit 122 via the switch 121. At S608, the display control unit 122 outputs, to the display unit 123, a magnified view as shown in FIG. 7C. The high-quality development unit 112 performs debayering (demosaicing) on the RAW image data, thereby transforming the RAW image into signals including luminance signals and color difference signals, and applies, to each signal, so-called development processing, which includes denoising, optical distortion correction, image optimization, etc.

The size (the number of pixels) of the developed image generated by the high-quality development unit 112 is the same as the total size of the image read from the image sensor unit 102 or the size determined by the user, and has a significantly higher quality than the image that has undergone the simplified development processing which limits the image size to two million pixels or less. Therefore, the image that has undergone the development processing performed by the high-quality development unit 112 satisfactorily fulfills the request for displaying a magnified view. Note that the processing returns to S601 when the displaying performed at S608 is stopped. At S601, when transition to the idle state S610 occurs, the processing according to the above-described flowchart shown in FIG. 5 is performed.

As described above, it can be assumed that the high-quality development processing starting from S604 of FIG. 6 occurs at the time when the follow-up development processing has not been performed, such as immediately after a shooting. According to the present embodiment, the follow-up development processing of images is completed step-by-step during a period in which the processing load on the apparatus is relatively low, for example during a period between shootings or when the apparatus is in the playback mode or in the sleep state and is waiting for a user operation. As a result, image files that have undergone the simplified development processing are replaced in a natural manner with image files that have undergone the high-quality development processing. Along with the progress of such replacement, the occurrence frequency of the high-quality development processing starting from S604 gradually decreases, and finally, it becomes possible to promptly output a high-quality image in response to a request for displaying a magnified view. Thus, the operability increases more and more.

Also, as described above, in the case where the RAW image data is held in the buffer unit 115, the image can be displayed promptly, because S605 can be skipped in such a case. Considering this, in order to make it more likely that the RAW image data is held in the buffer unit 115, in the case of the example view 700 shown in FIG. 7A and the example view 710 shown in FIG. 7B, it may be possible to read the RAW image data corresponding to the images 701 and the image 711 from the recording medium 152, etc. and store it in the buffer unit 115 in advance, and thereby prepare for displaying a magnified view. As the recording/playback unit 151 reads the corresponding RAW image data from the recording medium 152, etc. and stores it before an instruction to display a magnified view is made, a magnified view such as the example view 720 can be more promptly displayed when the instruction to display the magnified view is made.

As described above, in the single shooting 201, the image capturing apparatus 100 according to the present embodiment uses the simplified development unit 111 when performing the live-view display before a shooting instruction or the development processing on an image file generated in response to a shooting instruction. The simplified development unit 111 limits the image size after the development processing to two million pixels or less, or limits the denoising or the optical distortion correction to particular processing or omits the denoising or the optical distortion correction. Consequently, high-performance development processing in the case of, for example, shooting with two million pixels at the rate of 60 frames per second can be achieved with a small circuit size and a low power consumption. Meanwhile, the image capturing apparatus 100 according to the present embodiment generates RAW image data in response to an image shooting instruction, as described above. RAW image data is a high-quality image data that retains the most of the image information provided from the sensor signal processing unit 103. Development processing is not required when generating RAW image data. Therefore, the image capturing apparatus 100, with small-scale circuitry and a low power consumption, is capable of recording RAW image data while increasing the number of pixels in images and the speed of the continuous shooting.

Next, a description is given to operation of the image capturing apparatus 100 in the continuous shooting mode 203. FIG. 8 shows a flowchart relating to processing performed in the continuous shooting mode 203 according to the present embodiment. The flowchart shown in FIG. 8 illustrates the processing procedure performed by the control unit 161 while controlling each processing block. A program stored in a memory (ROM) of the control unit 161 is written into a memory (RAM), and a CPU executes the program, thereby achieving the procedure. The control unit 161 performs control of each unit according to a program. Each unit can operate independently. For example, the operation units may operate in parallel.

As shown in FIG. 8, when operation in the continuous shooting mode is started, preparations for the shooting and live-view processing is performed at S801. This processing corresponds to S301 to S307 and S320 shown in FIG. 3. Therefore, the details of the processing is not described below.

In the continuous shooting mode according to the present embodiment, the free storage space in the buffer unit 115 that stores a RAW file during the continuous shooting is monitored. When the free storage space in the buffer unit 115 is not sufficient for storing the RAW image data, the simplified development processing is omitted, and only the RAW compression and recording of the RAW image data are performed. Development processing is performed after the continuous shooting instruction is cancelled. When the user selects a continuous shooting mode as an operation mode, the user can also set the number of images that can be captured per second. The number of images may be freely set by the user or set according to a plurality of predetermined speed levels such as a low, middle, and high speed. For example, the number of still images that can be captured per second may be two at the low speed, four at the middle speed, and six at the high speed. These numbers are merely examples. It is possible to set in advance that the number will be three at the low speed, 12 at the high speed, and 14 at a super high speed. The information about the number of images that can be captured per second is held by the control unit 161 so that processing corresponding to an embodiment of the present invention can be performed. Note that when the continuous shooting mode is selected, the shooting is continued while the shutter button is pressed all the way, and RAW image data corresponding to the above-described number of images are generated.

The following describes the processing specific to the continuous shooting mode 203 according to the present embodiment, with respect to steps starting from S802 shown in FIG. 8. At S802, the control unit 161 determines whether RAW image data exists in the buffer unit 115. When RAW image data is stored in the buffer unit 115, transition to S803 occurs. When RAW image data is not stored therein, transition to S805 occurs. When the control unit 161 determines at S802 that RAW image data is stored in the buffer unit 115, the control unit 161 determines at S803 whether the RAW file and the image file including the image data obtained by performing development processing on the RAW image data stored in the RAW file is already recorded on the recording medium 152 or not. This determination can be made based on, for example, whether the identification code of the recording medium on which the RAW file and the image file included in the metadata part 412 of the RAW file exists or not, or based on the path information of the recording folder. When both the RAW file and the image file have been recorded on the recording medium 152, transition to S804 occurs, and when either one of them is not recorded thereon, transition to S805 occurs.

When both the RAW file and the image file have been recorded on the recording medium 152, the control unit 161, at S804, deletes the RAW image data stored in the buffer unit 115, and then transition to S805 occurs. This is because the RAW image data and the corresponding image data generated by the development processing are already stored in the recording medium 152 and it is unnecessary to retain the RAW image data in the buffer unit 115 for the development processing, etc., and also such deletion increases free storage space for storing new RAW image data.

Subsequently, at S805, the control unit 161 determines whether there is sufficient free storage space for storing the RAW image data transmitted by the RAW compressing unit 113 to the buffer unit 115. To make this determination, the RAW compressing unit 113 notifies the control unit 161 of the data amount of the RAW image data to be transmitted to the buffer unit 115, and the control unit 161 monitors the free storage space of the buffer unit 115. Note that free storage space is space within the buffer unit 115 and space where RAW image data can be newly stored. The control unit 161 compares the current free storage space of the buffer unit 115 with the data amount of the RAW image data notified by the RAW compressing unit 113, and determines whether the RAW image data can be stored in the buffer unit 115 or not. Alternatively, the data amount of the RAW image data that can be stored may be determined in advance according to the number of pixels of the image to be recorded, and the determination may be performed by comparison with this data amount. When the buffer unit 115 does not have sufficient free storage space for storing the RAW image data, transition to S812 occurs. At S812, the RAW image data is recorded on the recording medium 152 in order to increase the free storage space of the buffer unit 115. On the other hand, when the buffer unit 115 has sufficient free storage space for storing the RAW image data, transition to S806 occurs.

When there is no sufficient free storage space for storing the RAW image data, transition to S812 occurs without the determination as to the pressing of the shutter button at S806. Note that the same applies to the case where the shutter button is not pressed at the time of the determination at S805. If this is the case, information indicating that continuous shooting cannot be newly performed (e.g. "Busy" message) may be displayed by the display unit 123. Alternatively, the number of images that can be captured may be displayed according to the size of the free storage space.

At S806, whether the shutter button is being pressed or not is determined. The state where the shutter button is being pressed is the state where the user has made the shooting instruction for a continuous shooting or the shooting instruction is going on, and if this is the case, transition to S807 occurs. The state where the shutter button is not being pressed is the state where there is no shooting instruction from the user or the shooting instruction has been completed. If this is the case, processing returns to S801 and the preparation operation for shooting and the live-view display are repeatedly performed.

In response to the shooting instruction made at S806, the RAW compressing unit 113, at S807, acquires the RAW image data corresponding to the captured image and output by the sensor signal processing unit 103, and performs high-efficiency encoding (RAW compression) thereon. The compressed RAW image data is stored in the buffer unit 115 at S808, and then transition to S809 occurs.

At S809, the control unit 161 determines whether the free storage space of the buffer unit 115 is not smaller than a predetermined value (first threshold: threshold value 1) or not. This determination is made in order to determine whether to perform simplified development processing on the stored RAW image data or not. The first threshold is used for determining whether to perform the simplified development processing or not. The free storage space of the buffer unit 115 mentioned here is, as described above, space within the buffer unit 115 and space where RAW image data can be newly stored. The first threshold may be a value in bytes (e.g., the threshold of the free storage space is determined to be 10 megabytes), or a value in percentage (e.g., when the maximum storage capacity of the buffer unit 115 that can store the RAW image data is considered as 100%, the threshold of the free storage space is determined to be the size corresponding to 50.0%). In other words, when the maximum storage capacity is 100 megabytes, free storage space of 50 megabytes or greater can be determined as being no smaller than the first threshold.

The first threshold may not be a constant, and may be varied according to various parameters under control of the control unit 161. For example, when the speed of the continuous shooting by the image capturing apparatus 100 can be switched between the low speed, the middle speed, and the high speed, the first threshold may be controlled so as to change according to the speed of the continuous shooting by the image capturing apparatus 100 (the number of images that can be captured per unit time) and the assured minimum data transfer speed (class) of the recording medium 152 (SD card) as shown in FIG. 10. If this is the case, the control unit 161 selects the first threshold according to information indicating the number of images that can be captured per unit time, which is determined in advance at the time of setting of the continuous shooting mode.

SD cards have four classes, namely class 2, 4, 6 and 10. The assured minimum read-write data transfer speed is different for each class. Specifically, the assured minimum data transfer speed of class 2, class 4, class 6, and class 10 are respectively 2 MB per second, 4 MB per second, 6 MB per second, and 10 MB per second. In this way, lower class indicates a lower data transfer speed. Accordingly, it is necessary to compensate a slow transfer speed by increasing the maximum storage capacity for buffering. Considering this, in the example shown in FIG. 10, the value of the first threshold increases as the speed of the continuous shooting increases, whereas the value of the first threshold decreases as the class increases.

When it is determined at S809 that the free storage space of the buffer unit 115 is not smaller than the first threshold, new RAW image data obtained by continuous shooting performed hereafter can be stored in the buffer unit 115 while the RAW image data already stored in the buffer unit 115 is undergoing development processing performed in background. In this case, transition to S810 occurs. On the other hand, when it is determined that the free storage space of the buffer unit 115 is smaller than the first threshold, there is the possibility that the free storage space of the buffer unit 115 will be fully occupied by the continuous shooting performed hereafter, and, after the free storage runs out, the generation of new RAW image data will be suspended and the performance of the continuous shooting will be degraded. For this reason, the control unit 161 does not cause the simplified development processing by the simplified development unit 111, and then transition to S812 occurs.

At S810, the control unit 161 transmits an instruction (control signal) to the RAW decompressing unit 114, the simplified development unit 111, the switch 121, and the image compressing unit 141 so as to perform the simplified development processing on the RAW image data stored in the buffer unit 115. After the transmission of the instruction, transition to S811 occurs. Upon receipt of the instruction from the control unit 161, the RAW decompressing unit 114, the simplified development unit 111, the switch 121, and the image compressing unit 141 perform processing for acquiring the image data generated by the simplified development processing. This processing is performed in parallel with (in background of) the processing for storing the RAW image data into the buffer unit 115 (S801 to S808) during the continuous shooting. After the image compressing unit 141 completes the compression of the image data generated by the simplified development processing, the compressed image data is transmitted to the recording/playback unit 151.

At S811, the control unit 161 transmits, to the recording/playback unit 151, an instruction (control signal) to record the image data obtained by the simplified development processing. After the transmission of the instruction, transition to S812 occurs. At this moment, the control unit 161 may include, into the metadata of the RAW image data stored in the buffer unit 115, the identification code of the recording medium 152 on which the image file is recorded and the path information specifying the location of the folder in which the image file is recorded. Upon receipt of the instruction from the control unit 161, the recording/playback unit 151 records the image file including the compressed image data generated by the simplified development processing, onto the recording medium 152. This operation is performed in parallel with (in background of) the processing for storing the RAW image data into the buffer unit 115 (S801 to S808) during the continuous shooting.

At S812, the control unit 161 transmits, to the recording/playback unit 151, an instruction (control signal) to record the RAW image data in the buffer unit 115. After the transmission of the instruction, the processing returns to S801. At this moment, the control unit 161 may include, into the metadata of the RAW image data stored in the buffer unit 115, the identification code of the recording medium 152 on which the RAW file is recorded and the path information specifying the location of the folder in which the RAW file is recorded. Upon receipt of the control signal from the control unit 161, the recording/playback unit 151 reads the RAW image data stored in the buffer unit 115 as well as the header information and the metadata, and records them onto the recording medium 152. This operation is performed in parallel with (in background of) the processing for storing the RAW image data into the buffer unit 115 (S801 to S808) during the continuous shooting.

Note that, as described above, the data stored in the buffer unit 115 is updated such that a newer image is preferentially held therein, and the captured images are removed in the order from the oldest to the newest. When it is determined at S809 that the free storage space is smaller than the first threshold, the simplified development processing of the RAW image data is not performed, and accordingly there is the possibility that the RAW image data that has not undergone the development processing is removed from the buffer unit 115 if a large number of images are captured by the continuous shooting. Even in such a case, however, the RAW image data per se is recorded on the recording medium 152 at S812. Therefore, in the follow-up development processing performed later, high-quality development processing can be performed by reading the RAW file from the recording medium 152, and there is no serious problem.

In the description above, whether the writing onto the recording medium 152 has been completed or not is determined at S803 as to both the RAW file and the image file. According to the present embodiment, however, there are cases where the simplified development processing is not performed, depending on the size of the free storage space of the buffer unit 115. For this reason, a situation can be assumed where the image data that has undergone the development processing corresponding to the RAW image data stored in the buffer unit 115 is not entirely recorded on the recording medium 152. In such a case, the RAW image data of an older image may be preferentially deleted at S804 regardless of whether the writing of the image file has been completed or not. Alternatively, in the case of the continuous shooting mode, only whether the RAW file has been written onto the recording medium 152 or not may be determined at S803, and the RAW files already written may be deleted in the order from the oldest to the newest. The determination criteria may be changed according to the number of images captured per second. In other words, in the case of the low speed continuous shooting mode, the determination may be made on both the RAW file and the image file, and in the case of the middle speed or high speed continuous shooting mode, the determination may be made on only the RAW file.

In the processing performed at S810, S811, and S812, each unit receiving the instruction from the control unit 161 performs the processing in background of the continuous shooting. However, when previous instructions have not been completed at the time of receiving the instruction from the control unit 161, the unit may put new instructions into the stack, and sequentially perform the instructions in the stack after completing the processing in execution.

As described above, the image capturing apparatus 100 according to the present embodiment determines whether to perform the simplified development processing, the compression, and the recording, of the images generated from the RAW image data when operating in the continuous shooting mode, according to the size of the free storage space of the buffer unit 115. With such a configuration, it is possible to avoid the situation where the free storage space of the buffer unit 115 is fully occupied by the RAW image data and the buffer unit 115 cannot accommodate new RAW image data (i.e., situation where the speed of the continuous shooting is degraded).

Embodiment 2

Embodiment 1 is configured such that, when a user instruction for shooting (recording) an image is made, the RAW image data and the image data generated by the simplified development processing are recorded, and high-quality development processing is performed by the follow-up development processing. In contrast, according to Embodiment 2, when a user instruction for shooting an image is made, the simplified development processing and the high-quality development processing are performed in parallel with the recording of the RAW image data, and image data that has undergone the simplified development processing and the image data that has undergone the high-quality development processing are recorded.

If the high-quality development processing is performed at the time of shooting, it is necessary to retain the corresponding RAW image data in the buffer unit 115 until the completion of the high-quality development processing. The high-quality development processing takes longer time than the simplified development processing to process one screen. Therefore, during the continuous shooting, the RAW image data that cannot be recorded on the recording medium 152 because of uncompleted high-quality development processing is stored in the buffer unit 115.

The present embodiment describes another embodiment of the continuous shooting mode of the image capturing apparatus 100 described in Embodiment 1. In Embodiment 1, whether to perform the simplified development processing, the compression, and the recording, of the RAW image data is determined by the comparison of the free storage space of the buffer unit 115 with the first threshold. When the free storage space is not sufficient, the recording of the RAW image data onto the recording medium 152 is preferentially performed, and the simplified development processing is omitted. In contrast, the present embodiment is characterized by that whether to perform the high-quality development processing or not is also controlled according to the result of the comparison of the free storage space of the buffer unit 115 with the threshold.

Figure 11A:
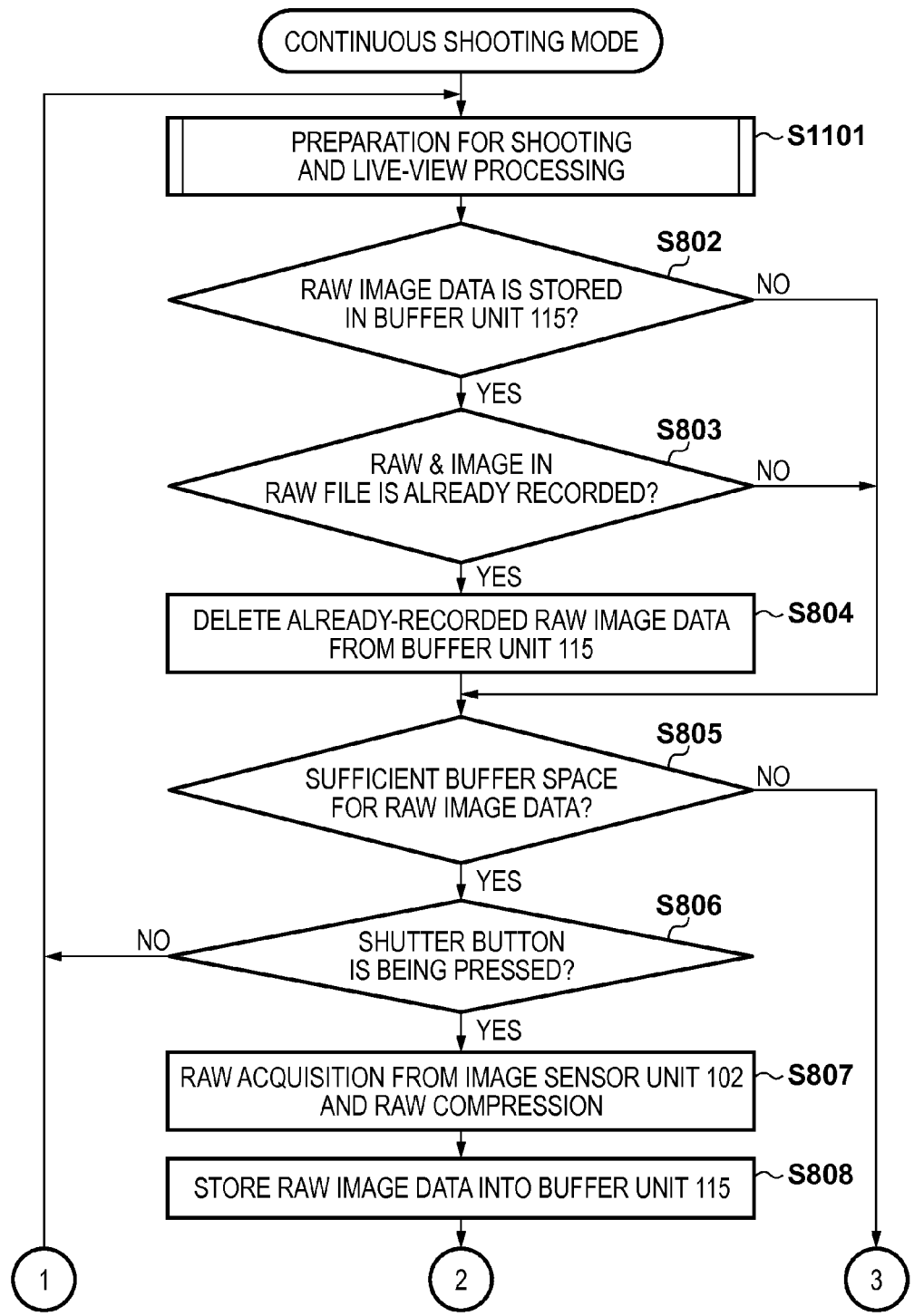
FIGS. 11A and 11B show flowcharts relating to processing performed in a continuous shooting mode according to Embodiment 2 of the invention.
Figure 11B:
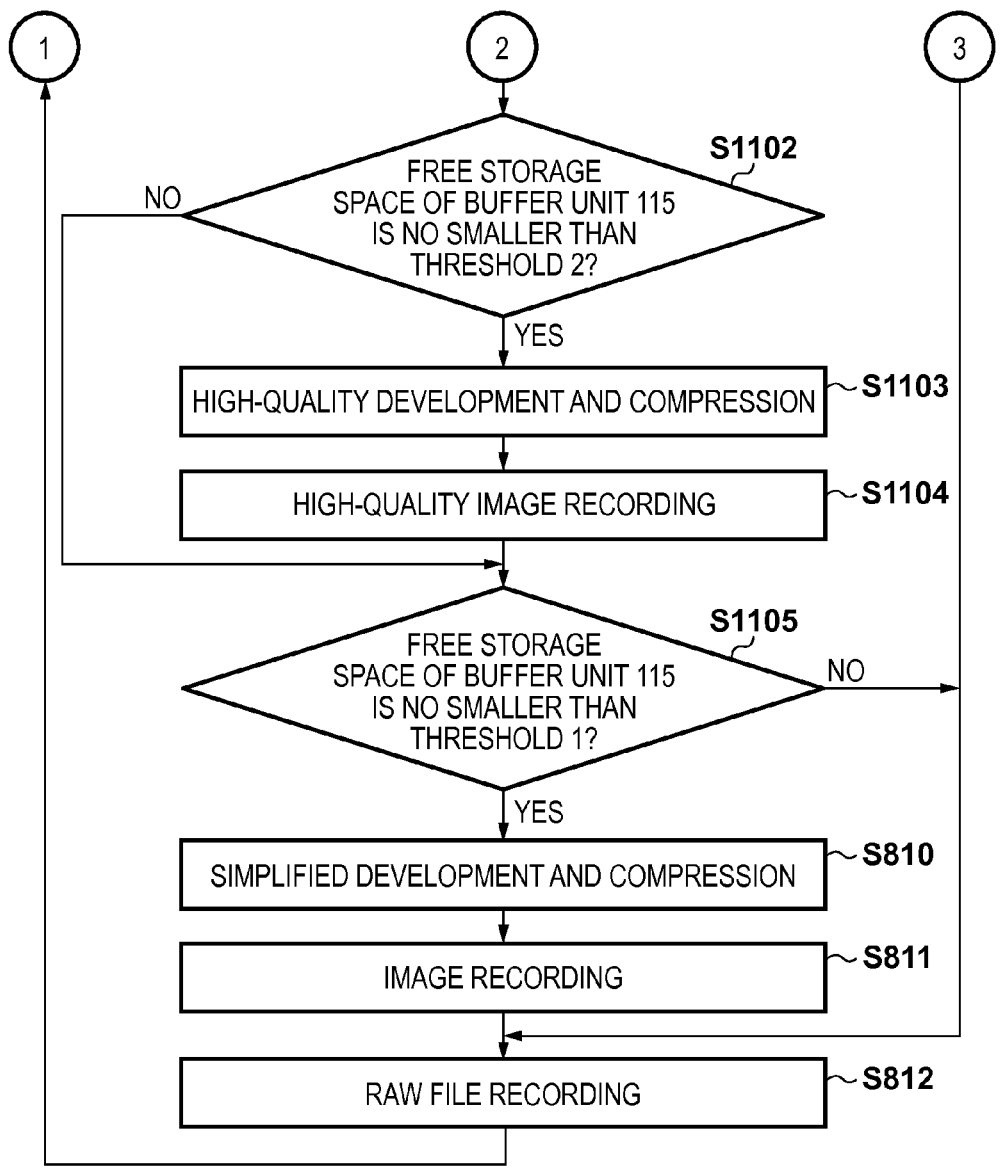

Operation of the image capturing apparatus 100 according to the present invention in the continuous shooting mode 203 is described below with reference to the flowcharts shown in FIGS. 11A and 11B. FIGS. 11A and 11B show flowcharts relating to processing performed in the continuous shooting mode according to the present embodiment. The flowcharts shown in FIGS. 11A and 11B illustrate the processing procedure performed by the control unit 161 while controlling each processing block. A program stored in a memory (ROM) of the control unit 161 is written into a memory (RAM), and a CPU executes the program, thereby achieving the procedure. The control unit 161 performs control of each unit according to a program. Each unit can operate independently. For example, the operation units may operate in parallel.

As shown in FIGS. 11A and 11B, when operation in the continuous shooting mode is started, preparations for the shooting and live-view processing is performed at S1101. This processing corresponds to S301 to S307 and S320 shown in FIG. 3. Therefore, the details of the processing is not described below. Also, in FIGS. 11A and 11B, the steps corresponding to the flowchart shown in FIG. 8 are given the same reference numbers, and the description of FIG. 8 applies to these steps unless otherwise specified.

After the buffer unit 115 stores the RAW image data at S808, the control unit 161, at S1102, determines whether the free storage space of the buffer unit 115 is not smaller than a predetermined threshold value (second threshold: threshold value 2). The second threshold is a threshold used for determining whether to perform the high-quality development processing. When the free storage space is not smaller than the second threshold, transition to S1103 occurs. When the free storage space is smaller than the second threshold, transition to S1105 occurs. At S1103, the control unit 161 transmits an instruction (control signal) to the RAW decompressing unit 114, the high-quality development unit 112, the switch 121, and the image compressing unit 141 so as to perform the high-quality development processing on the RAW image data stored in the buffer unit 115. After the transmission of the instruction, transition to S1104 occurs. Upon receipt of the instruction from the control unit 161, the RAW decompressing unit 114, the high-quality development unit 112, the switch 121, and the image compressing unit 141 perform processing for acquiring the image data generated by the high-quality development processing. This operation is performed in parallel with (in background of) the processing for storing the RAW image data into the buffer unit 115 (S1101, S801 to S808, S1102) during the continuous shooting. After the image compressing unit 141 completes the compression of the image data, the compressed image data is transmitted to the recording/playback unit 151.

Subsequently, at S1104, the control unit 161 transmits, to the recording/playback unit 151, an instruction (control signal) to record the image data obtained by the high-quality development processing. After the transmission of the instruction, transition to S1105 occurs. Upon receipt of the instruction from the control unit 161, the recording/playback unit 151 records the image file including the compressed image data generated by the high-quality development processing, onto the recording medium 152. This operation is performed in parallel with (in background of) the processing for storing the RAW image data into the buffer unit 115 (S1101, S801 to S808, S1102) during the continuous shooting. Then, transition to S1105 occurs.

At S1105, the control unit 161 determines whether the free storage space of the buffer unit 115 is not smaller than a predetermined threshold value (first threshold: threshold value 1) or not. As in Embodiment 1, the first threshold is a threshold used for determining whether to perform the simplified development processing. When the free storage space is not smaller than the first threshold, transition to S810 occurs. When the free storage space is smaller than the first threshold, transition to S812 occurs. These operations are the same as those already described for FIG. 8. In FIG. 11B, even after the high-quality development processing and the recording are performed at S1103 and S1104, the simplified development processing and the recording are performed when the free storage space is not smaller than the first threshold. However, the simplified development processing and the recording may not be performed after the high-quality development processing and the recording are performed.

In this way, according to the present embodiment, at the switching between the high-quality development processing and the simplified development processing, the size of the free storage space of the buffer unit 115 is determined by using two thresholds, namely the first threshold, and the second threshold described below. Here, assume that the second threshold is greater than the first threshold. In other words, a determination using the second threshold is made as to whether the size of the free storage space of the buffer unit 115 is sufficient or not for storing new RAW image data during the high-quality development processing performed on the already stored RAW image data in background. If it is determined that it is difficult to store new RAW image data during the high-quality development processing, a determination using the first threshold is made as to whether new RAW image data can be stored in the buffer unit 115 or not during the simplified development processing. Note that the simplified development processing may be performed after the high-quality development processing.

The following provides a specific description of the first threshold and the second threshold. As in Embodiment 1, these thresholds of the free storage space may be values in bytes, such as 10 megabytes, or values in percentage, such as 50% with respect to the maximum storage capacity, considered as 100%, of the buffer unit 115 that can store the RAW image data. Also, the first threshold and the second threshold may not be constants, and may be varied according to various parameters under control of the control unit 161.

For example, when the speed of the continuous shooting by the image capturing apparatus 100 can be switched between the low speed, the middle speed, and the high speed, the thresholds may be controlled so as to change according to the speed of the continuous shooting by the image capturing apparatus 100 (the number of images that can be captured per unit time) and the assured minimum data transfer speed (class) of the recording medium 152 (SD card), as shown in FIG. 12A and FIG. 12B. FIG. 12A shows an example of the setting of the second threshold corresponding to the present embodiment, and FIG. 12B shows an example of the setting of the first threshold corresponding to the present embodiment. As shown in these figures, the second threshold shown in FIG. 12A is greater than the first threshold shown in FIG. 12B when the conditions such as the class of the SD card and the speed of the continuous shooting are the same. Note that the values shown in FIG. 12A and FIG. 12B are merely examples, and the specific values of the thresholds are not limited to them.

In the processing performed at S1103, S1104, S810, S811, and S812, each unit receiving the instruction from the control unit 161 performs the processing in background of the continuous shooting. However, when previous instructions have not been completed at the time of receiving the instruction from the control unit 161, the unit may put new instructions into the stack, and sequentially perform the instructions in the stack after completing the processing in execution.

As described above, the image capturing apparatus 100 according to the present embodiment is capable of performing step-by-step switching between the development processing, the compression, and the recording for high-quality images and those for simplified images when operating in the continuous shooting mode, according to the size of the free storage space of the buffer unit 115. With such a configuration, it is possible to avoid the situation where the free storage space of the buffer unit 115 is fully occupied by the RAW image data and the buffer unit 115 cannot accommodate new RAW image data (i.e., situation where the speed of the continuous shooting is degraded).

In the second embodiment, image data that has undergone the simplified development processing and image data that has undergone the high-quality development processing are both generated and recorded at the timing of capturing of a RAW image. However, the generation of the image data that has undergone the simplified development processing may be omitted.

In other words, when a RAW image is captured, it is possible that only the image data that has undergone the high-quality development processing is generated and recorded, and the generation of the image data that has undergone the simplified development processing may be omitted. If this is the case, the processing at S1105, S810, and S811 shown in FIG. 11B are omitted, and the processing at S812 is performed after the completion of the processing at S1104.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-100783, filed on May 14, 2014 which is hereby incorporated by reference herein in its entirety.

What is claimed is:

1. An image capturing apparatus comprising:
   an image capturing unit;
   a generating unit configured to generate RAW image data by using an image obtained by the image capturing unit, wherein the generating unit sequentially generates RAW image data of a plurality of pictures in a continuous shooting mode;
   a memory configured to temporarily store the RAW image data;
   a first development unit configured to perform development processing on the RAW image data stored in the memory;
   a recording unit configured to record, onto a recording medium, (1) first image data developed by the first development unit and (2) the RAW image data stored in the memory; and
   a control unit configured to, in the continuous shooting mode, control whether to perform, by the first development unit, the development processing on the RAW image data stored in the memory, in accordance with free storage space of the memory available for storing the RAW image data,
   wherein the control unit, in the continuous shooting mode, controls (1) the generating unit to generate the RAW image data and to write the RAW image data into the memory, (2) the recording unit to read the RAW image data from the memory and to record the RAW image data onto the recording medium, and (3) the first development unit not to perform the development processing on the RAW image data stored in the memory, if the free storage space of the memory available for storing the RAW image data is smaller than a first threshold.

2. The image capturing apparatus according to claim 1, wherein the control unit sets the first threshold to be greater for a greater number of RAW image data generated per unit time in the continuous shooting mode.

3. The image capturing apparatus according to claim 1, wherein the control unit sets the first threshold to be smaller for a higher data transfer speed onto the recording medium.

4. The image capturing apparatus according to claim 1, wherein, in the continuous shooting mode, if the free storage space of the memory is not sufficient for storing new RAW image data, the control unit controls the generating unit so that the generating unit does not write new RAW image data into the memory, and controls the recording unit so that the recording unit records, onto the recording medium, RAW image data that is stored in the memory and that is not recorded on the recording medium.

5. The image capturing apparatus according to claim 4, wherein, in the continuous shooting mode, the control unit performs control so that RAW image data already recorded on the recording medium is deleted from the memory from among the RAW image data stored in the memory.

6. The image capturing apparatus according to claim 1, further comprising a second development unit configured to perform a second development processing, having a lower processing load than the development processing performed by the first development unit, on the RAW image data stored in the memory, wherein the recording unit records, onto the recording medium, second image data obtained by the second development unit, and wherein in the continuous shooting mode, if the free storage space of the memory available for storing the RAW image data is not smaller than a second threshold that is smaller than the first threshold, the control unit performs control so that the second development processing on the RAW image data is performed by the second development unit.

7. The image capturing apparatus according to claim 6, further comprising a unit configured to generate information indicating whether or not the first image data corresponding to the RAW image data has been generated, wherein, when the information indicates that the first image data has not been generated, the control unit controls the first development unit so that the first development unit performs development processing on the RAW image data.

8. The image capturing apparatus according to claim 6, further comprising:

a display control unit configured to cause a display unit to display an image corresponding to the first image data or an image corresponding to the second image data; and a unit configured to generate information indicating whether the first image data corresponding to the RAW image data has been generated or not, wherein, when the information indicates that the first image data has not been generated and that the image corresponding to the second image data is to be displayed in magnified view by the display unit, the control unit controls the first development unit so that the first development unit performs development processing on the RAW image data.

9. The image capturing apparatus according to claim 1, further comprising:

a RAW compressing unit configured to generate compressed RAW image data by compressing the RAW image data; and a decompressing unit configured to decompress the compressed RAW image data, wherein the memory temporarily stores the compressed RAW image data, and wherein the first development unit performs the development processing on the decompressed RAW image data.

10. A control method of an image capturing apparatus, comprising:

a generating step of generating RAW image data by using an image obtained by an image capturing unit, wherein the generating step sequentially generates RAW image data of a plurality of pictures in a continuous shooting mode;

a storing step of temporarily storing the RAW image data within a memory;

a first development step of performing development processing on the RAW image data stored in the memory; and a recording step of recording, onto a recording medium, (1) first image data developed in the first development step and (2) the RAW image data stored in the memory, wherein, in the continuous shooting mode, it is controlled whether to perform in the first development step the development processing on the RAW image data stored in the memory, in accordance with free storage space of the memory available for storing the RAW image data, and wherein if the free storage space of the memory available for storing the RAW image data is smaller than a first threshold, (1) in the generating step, the RAW image data is generated and written into the memory, (2) in the storing step, the RAW image data is read from the memory and recorded onto the recording medium, and (3) in the first development step, the development processing is not performed on the RAW image data stored in the memory.

11. A non-transitory computer readable storage medium on which is stored a program causing an image capturing apparatus including an image capturing unit and a memory to perform steps comprising:

a generating step of generating RAW image data by using an image obtained by the image capturing unit, wherein the generating step sequentially generates RAW image data of a plurality of pictures in a continuous shooting mode;

a storing step of temporarily storing the RAW image data within the memory;

a first development step of performing development processing on the RAW image data stored in the memory; and a recording step of recording, onto a recording medium, (1) first image data developed in the first development step and (2) the RAW image data stored in the memory, wherein, in the continuous shooting mode, it is controlled whether to perform in the first development step the development processing on the RAW image data stored in the memory, in accordance with free storage space of the memory available for storing the RAW image data, and wherein if the free storage space of the memory available for storing the RAW image data is smaller than a first threshold, (1) in the generating step, the RAW image data is generated and written into the memory, (2) in the storing step, the RAW image data is read from the memory and recorded onto the recording medium, and (3) in the first development step, the development processing is not performed on the RAW image data stored in the memory.

* * * * *